United States Patent
Au et al.

(10) Patent No.: US 7,986,441 B2
(45) Date of Patent: Jul. 26, 2011

(54) EMBEDDING WATERMARK INTO HALFTONE IMAGE WITH LOW DISTORTION USING PARITY VALUES FOR OVERLAPPING GROUPS OF CANDIDATE SITES

(75) Inventors: Oscar Chi Lim Au, Hong Kong (CN); Richard Yuk Ming Li, Hong Kong (CN)

(73) Assignee: Wong Technologies L.L.C., Wilmington, DE (US)

( * ) Notice: Subject to any disclaimer, the term of this patent is extended or adjusted under 35 U.S.C. 154(b) by 767 days.

(21) Appl. No.: 12/060,949

(22) Filed: Apr. 2, 2008

(65) Prior Publication Data
US 2008/0247002 A1    Oct. 9, 2008

Related U.S. Application Data

(60) Provisional application No. 60/907,513, filed on Apr. 4, 2007.

(51) Int. Cl.
*H04N 1/405* (2006.01)
*H04N 1/409* (2006.01)
*B41M 3/10* (2006.01)

(52) U.S. Cl. ............. 358/3.06; 358/3.26; 358/3.28

(58) Field of Classification Search .......... 358/1.9, 358/3.06, 3.26, 3.28, 534; 382/100, 190, 382/237, 276; 283/72, 113; 347/107
See application file for complete search history.

(56) References Cited

U.S. PATENT DOCUMENTS

| | | | |
|---|---|---|---|
| 7,058,199 B1 * | 6/2006 | Au et al. ................. | 382/100 |
| 7,804,977 B2 * | 9/2010 | Au et al. ................. | 382/100 |
| 2005/0018853 A1 | 1/2005 | Lain et al. | |
| 2005/0135656 A1 | 6/2005 | Alattar et al. | |
| 2007/0014428 A1 | 1/2007 | Kountchev et al. | |
| 2007/0047762 A1 | 3/2007 | Au et al. | |
| 2009/0046850 A1 * | 2/2009 | Au et al. ................. | 380/28 |

OTHER PUBLICATIONS

Guo, et al. "Watermarking in Halftone Images with Parity-Matched Error Diffusion" Proc. IEEE Int. Conf. on Acoustics, Speech, and Signal Processing Proceeding, vol. 2, pp. 825-828, Mar. 2005. 0-7803-8874-7/05. http://ieeexplore.ieee.org/iel5/9711/30651/01415532.pdf?tp=&arnumber=1415532&isnumber=30651. Last accessed Apr. 9, 2008, 4 pages.

Yip, et al. "PI-Preserve Data Hiding for Halftone Image" in Proceedings of 2005 International Symposium on Intelligent Signal Processing and Communication Systems, pp. 125-128, Dec. 13-16, 2005 Hong Kong. http://ieeexplore.ieee.org/iel5/10632/33566/01595362.pdf?tp=&arnumber=1595362&isnumber=33566. Last accessed Apr. 9, 2008, 4 pages.

(Continued)

*Primary Examiner* — Scott A Rogers
(74) *Attorney, Agent, or Firm* — Turocy & Watson, LLP

(57) ABSTRACT

System and methodologies are provided herein for low-distortion image watermarking. Parity relationships between multiple pixels and/or regions of an image can be leveraged as described herein to reduce the amount of toggling required to embed a watermark in an image, thereby increasing watermark efficiency and reducing visual artifacts introduced in a watermarked image. Various algorithms for leveraging parity relationships are described herein, including a Block-Overlapping Parity Check (BOPC) algorithm, a Champagne Pyramid Parity Check (CPPC) algorithm, and a Tree-Based Parity Check (TBPC) algorithm.

20 Claims, 20 Drawing Sheets

OTHER PUBLICATIONS

Fu, et al. Data Hiding Watermarking for Halftone Images. Proc. IEEE Transactions on Image Processing, Vo 11, Issue 4, pp. 477-484, Apr. 2002. Publisher Item Identifier S 1057-7149(02)01322-2. http://ieeexplore.ieee.org/iel5/83/21571/00999680.pdf?tp=&arnumber=999680&isnumber=21571. Last accessed Apr. 9, 2008, 8 pages.

Huang, et al. Embedding Image Watermarks in DC Components. IEEE Trans. Circuits Syst.: Video Technol., vol. 10, No. 6, pp. 974-979, Sep. 2000. http://ieeexplore.ieee.org/iel5/76/18781/00867936.pdf?tp=&arnumber=867936&isnumber=18781. Last accessed Apr. 9, 2008, 6 pages.

Perez-Gonzalez, et al. "Quantized Projection Data Hiding," in Proc. IEEE Int. Conf. Image Process., vol. 2, Sep. 2002, pp. 889-892. http://ieeexplore.ieee.org/iel5/8052/22295/01040094.pdf?tp=&arnumber=1040094&isnumber=22295. Last accessed Apr. 9, 2008, 4 pages.

Alattar. Reversible Watermark Using the Difference Expansion of a Generalized Integer Transform. IEEE Trans. on Image Processing, vol. 13, No. 8, Aug. 2004. http://www.digimarc.com/tech/docs/dmrc_generalized_integer.pdf. Last accessed Apr. 9, 2008, 11 pages.

Yip, et al. "Generalized Lossless Data Hiding by Multiple Predictors", in Proceeding of IEEE International Symposium on Circuits and Systems, pp. 1426-1429, May 2006. http://ieeexplore.ieee.org/iel5/11145/35661/01692863.pdf?tp=&arnumber=1692863&isnumber=35661. Last accessed Apr. 9, 2008, 4 pages.

Yeung, et al. Invisible watermarking for image verification. Journal of Electronic Imaging 7(3), 578-591 (Jul. 1998). 1017-9909/98, SPIE and IS&T. http://spie.org/x1636.xml?Search_Origin=QuickSearch&Search_Results_URL=http%3A%2F%2Fspie.org%2Fx1636.xml&Alternate_URL=http%3A%2F%2Fspie.org%2Fx18509.xml&Alternate_URL_Name=timeframe&Alternate_URL_Value=Exhibitors&UseJavascript=1&Please_Wait_URL=http%.

International Search Report & Written Opinion dated Jun. 17, 2009 for PCT Application Serial No. PCT/US08/59300, 11 Pages.

* cited by examiner

| Group | 1 | 2 | 3 | 4 |
|---|---|---|---|---|
| Arrangement of Bubble | 1 | 2<br>2 | 3 3 | 4 4<br>4 4 |

5th Row

1st Row

1100 →

Champagne
Pyramid

Information

US 7,986,441 B2

EMBEDDING WATERMARK INTO HALFTONE IMAGE WITH LOW DISTORTION USING PARITY VALUES FOR OVERLAPPING GROUPS OF CANDIDATE SITES

CROSS-REFERENCE

This application claims the benefit of U.S. Provisional Patent Application Ser. No. 60/907,513, filed on Apr. 4, 2007, entitled "MULTIMEDIA WATERMARKING TECHNIQUES WITH LOW DISTORTION."

TECHNICAL FIELD

The present disclosure relates generally to image processing, and more particularly to techniques for embedding watermark information into an image.

BACKGROUND

As multimedia applications have grown in popularity and technology relating to the Internet and wireless technology has advanced, there has been a rapid rise in the use of digital media such as images. For example, numerous images are now accessible through the World Wide Web. However, because of the accessibility of these digital images, they can be easily downloaded and used by an unauthorized user for an unexpected purpose. As a result, digital watermarking techniques are often used to prove ownership and authenticity of digital media by hiding information, such as a random sequence or a logo, into the media.

To enhance the security of a watermark in an image, it can be appreciated that the watermark should be embedded in the image in such a way that it is perceptually transparent and robust. However, most existing image watermarking techniques are lossy and introduce permanent distortion into a host image during the embedding process, which results in a permanent peak signal-to-noise ratio (PSNR) loss in the host image. As a result, many existing watermarking techniques cannot be applied in medical, military, and/or applications that are sensitive to embedding distortion and prohibit permanent loss of signal fidelity. A lossless, reversible watermarking scheme is therefore required for such applications, where the original host signal can be perfectly recovered upon extracting the watermark from the host signal. Algorithms for reversible watermarking have been proposed; however, the payload of such algorithms is prohibitively small as compared to that achievable by lossy watermarking algorithms.

Further, in the specific example of applications such as books, magazines, newspapers, printer outputs, and fax documents that utilize black-and-white halftone images that contain only black and white pixels, it is often desirable to hide value-adding invisible data, such as a company logo, for copyright protection and/or authentication purposes. However, most existing data hiding algorithms cannot readily be applied to embed data into these and/or similar halftone signals.

In view of the above, there exists a need for efficient and high-payload watermarking techniques for digital images.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present disclosure provides systems and methodologies for low-distortion watermarking of halftone images. In accordance with one aspect, parity relationships between multiple pixels and/or regions of an image are leveraged to reduce the amount of toggling required to embed a watermark in an image, thereby increasing watermark efficiency and reducing visual artifacts introduced in a watermarked image.

In one example, a Block-Overlapping Parity Check (BOPC) algorithm can be utilized to extend a conventional halftone image data hiding algorithm, such as Data Hiding Smart Pair Toggling (DHSPT), to improve the visual quality of images watermarked using such a conventional algorithm. By determining and leveraging various properties of a block-overlapping parity check for a host image, the number of pair toggling operations required DHSPT and/or a similar conventional data hiding algorithm can be reduced.

In another example, a Champagne Pyramid Parity Check (CPPC) algorithm and/or a Tree-Based Parity Check (TBPC) algorithm can be utilized to improve the visual quality of an image processed by a conventional reversible watermarking technique. By representing candidate sites for data embedding in a host image as a hierarchical structure, the CPPC algorithm and/or the TBPC algorithm can reduce the total number of pixel changes required during the watermark insertion process, thereby increasing efficiency and reducing distortion introduced into a watermarked image.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

FIGS. 5-6 illustrate example mapping operations that can be performed in connection with one or more data hiding techniques described herein.

FIGS. 7-8 illustrate an example bubble formation operation that can be performed in connection with one or more data hiding techniques described herein.

FIG. 9 illustrates an example toggling operation that can be performed in connection with one or more data hiding techniques described herein.

DETAILED DESCRIPTION

Figure 1:
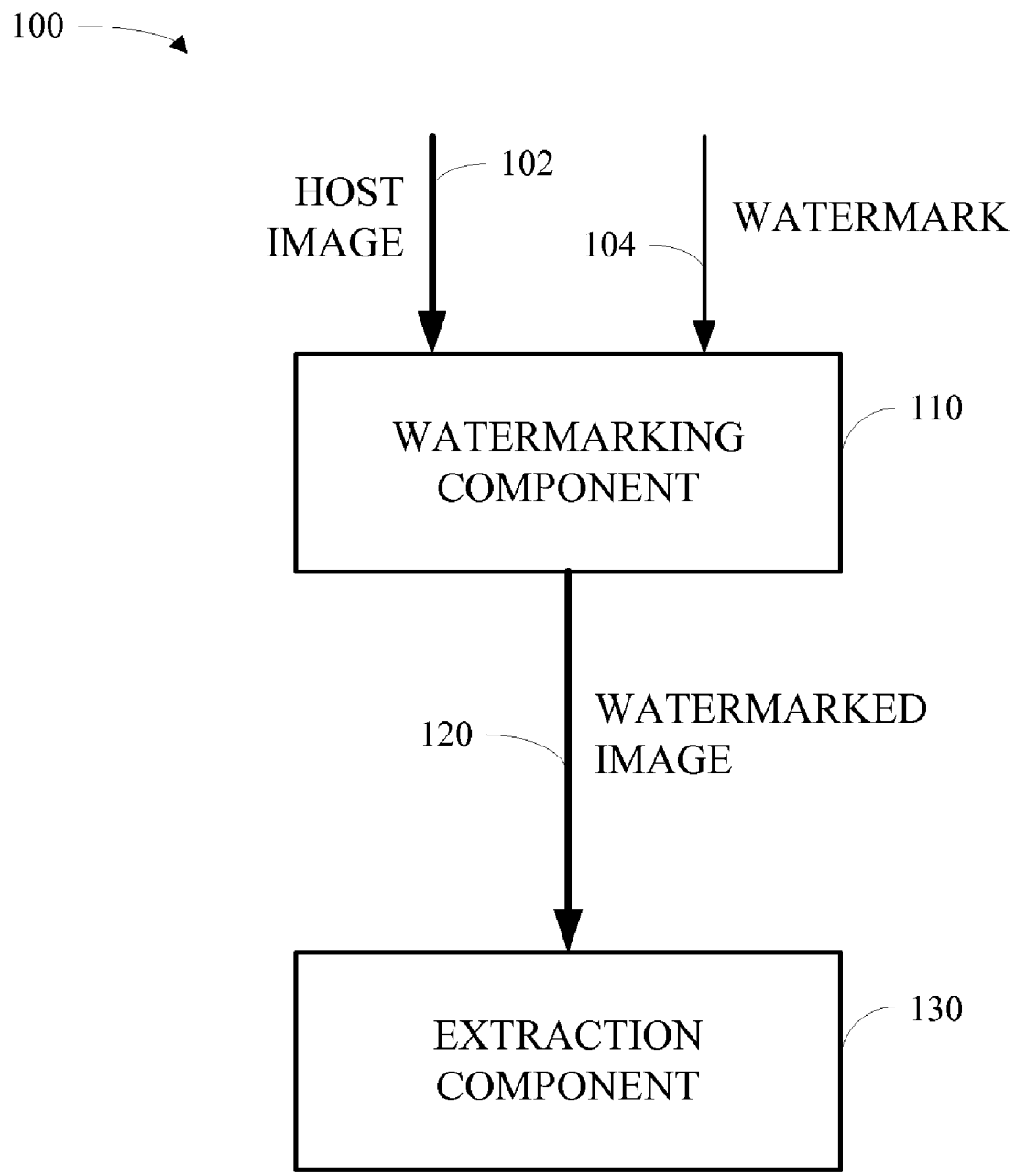
FIG. 1 is a high-level block diagram of a system for processing and communicating an image in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Referring to the drawings, FIG. 1 illustrates a high-level block diagram of a system 100 for processing and communicating an image in accordance with various aspects described herein. In one example, system 100 includes a watermarking component 110 that can create a watermarked image 120 from a host image 102 by embedding a watermark 104 in the host image 102. While the watermark 104 is illustrated in system 100 as being provided to the watermarking component 110 from an external source, it should be appreciated that a watermark 104 can alternatively be created internally by the watermarking component 110. Further, while system 100 illustrates watermarking of a two-dimensional image, it should be appreciated that the watermarking component 110 can alternatively receive data of three or more dimensions, such as a graphical representation of an object in three spatial dimensions and/or a video sequence containing a series of two-dimensional video frames having respective durations in time. In such an example, the watermarking component 110 can process respective two-dimensional cross-sections or frames of a host signal as a series of host images 102, into which the watermarking component 110 can embed one or more watermarks 104 to generate corresponding watermarked images 120.

In accordance with one aspect, the watermarking component 110 can be utilized to embed a binary watermark 104 into a halftone host image 102. As used herein and generally in the art, halftone images are generated such that all pixels in the image have one of two possible pixel values (e.g., black or white), which can be respectively represented by the binary digits "0" and "1." Such images are widely used in books, magazines, newspapers, printer outputs, fax documents, and the like to represent multitone grayscale images. Many existing data hiding techniques are designed for multitone images and are therefore not applicable to halftone images. To overcome these limitations, the watermarking component 110 can implement one or more algorithms, such as Block-Overlapping Parity Check (BOPC), Champagne Pyramid Parity Check (CPPC), Tree-Based Parity Check (TBPC), and the like to embed watermark data into a halftone host image 102. The BOPC, CPPC, and TBPC algorithms are described in further detail infra.

In accordance with another aspect, watermarked images 120 generated by the watermarking component 110 can be communicated through one or more communication channels to an extraction component 130 that can recover respective host images 102 from the watermarked images 120 by extracting respective watermarks 104 from the watermarked images 120. In one example, the extraction component 130 can obtain a binary watermark 104 that has been embedded in a watermarked image 120 by employing a data hiding algorithm such as BOPC, CPPC, and/or TBPC to determine which pixels in the image provide data relating to the watermark 104. The determined pixels and/or their surrounding areas can then be examined to ascertain data comprising the watermark 104. In one example, the size and shape of a watermark 104 utilized by the watermarking component 110 can be communicated from the watermarking component 110 to the extraction component 130 and/or known a priori by the extraction component 130.

To facilitate the communication of watermarked images 120 between entities in system 100, one or more wired (e.g., Ethernet, IEEE-802.3, etc.) and/or wireless (IEEE-802.11, Bluetooth™, etc.) networking technologies can be utilized. Additionally, the extraction component 130 can be directly connected to the watermarking component 110 or indirectly connected through a third party device (not shown). For example, the extraction component 130 can be associated with a client computer that receives watermarked images 120 from a Web server that provides media content over the Internet via an Internet service provider (ISP). As another example, the extraction component 130 can be associated with a mobile terminal that accesses media content via a cellular communications network such as the Global System for Mobile Communications (GSM), a Code Division Multiple Access (CDMA) communication system, and/or another suitable cellular communications network.

Figure 2:
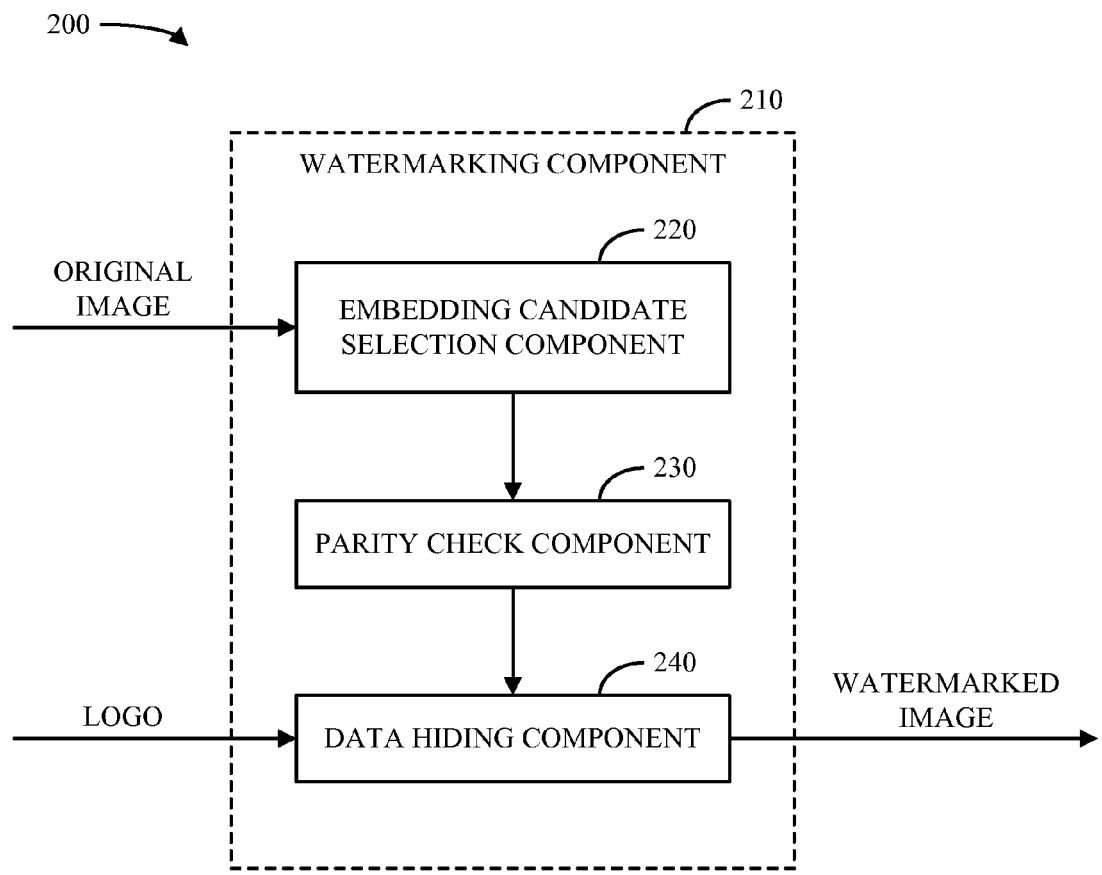
FIGS. 2-3 are block diagrams of respective systems for embedding information in an image in accordance with various aspects.

Referring now to FIG. 2, a block diagram of a system 200 for embedding information in an image is provided. In accordance with one aspect, system 200 can include a watermarking component 210, which can accept an original image and a logo as input, facilitate embedding of the logo into the original image, and provide a watermarked image as output. In one example, to facilitate embedding a logo into an original image to produce a watermarked image, the watermarking component 210 can comprise an embedding candidate selection component 220, a parity check component 230, and/or a data hiding component 240.

In accordance with one aspect, the embedding candidate selection component 220 can search, scan, and/or otherwise process an original image to identify candidate sites in the original image for embedding data. Candidate sites in an image can be individual pixels and/or groups of contiguous or non-contiguous pixels. In one example, the embedding candidate selection component can identify "master" and "slave" candidate sites in an image. Based on sets of master and slave candidate embedding sites, a data hiding algorithm can then be configured upon toggling a master site to additionally toggle a neighboring slave site having an opposite halftone value. By doing so, the local intensity of the image region that includes the master site can be preserved, thereby improving overall visual quality of the image.

Once the embedding candidate selection component 220 has identified candidate sites in an image for embedding data, the candidate sites can be provided to a parity check component 230. In accordance with one aspect, the parity check component 230 can divide candidate sites into groups. These groups can then be respectively characterized by the parity of the halftone values of the candidate sites that constitute the respective groups. By way of specific, non-limiting example, halftone values can be represented as a binary digit "0" or "1," and the parity of a group of such halftone values can be even-odd parity such that, for example, the parity of a group is "1" if the number of candidate sites in the group having a halftone value of "1" is odd and "0" if the number is even. It should be appreciated, however, that this constitutes merely one way in which the parity of a group of sites can be obtained and that any suitable technique could be used.

In accordance with one aspect, the parity of respective groups of candidate sites in an original image as formulated by the parity check component 230 can be utilized to represent information bits in a logo. Further, the parity check component can formulate the groups of candidate sites such that they overlap, thereby allowing the parity of multiple groups to be altered by toggling the halftone value of a single candidate site. By doing so, the amount of toggling necessary to embed a logo into an original image can be reduced, thereby increasing embedding efficiency and reducing distortion introduced into a watermarked image. In accordance with various aspects described herein, the parity check component 230 can utilize a variety of algorithms for dividing a set of candidate sites in an original image into groups to facilitate efficient watermarking of the image. Examples of algorithms that can be utilized are described in detail infra.

After processing by the parity check component 230, groups of candidate sites in the original image formed by the parity check component 230 and their respective parity values can be provided to a data hiding component 240 to facilitate embedding of a logo into the original image. In one example, the data hiding component 240 can compare respective information bits of the logo to the parity or corresponding groups of candidate sites in the original image. If it is determined that an information bit in the logo and the parity of its corresponding group of candidate sites does not match, a candidate site in the group can be toggled to alter the parity of the group such that a match is created. In accordance with one aspect, respective groups of candidate sites provided by the parity check component 230 can share candidate sites and/or otherwise overlap. As a result, the parity of multiple groups can be changed with a single toggling operation, thereby reducing the amount of toggling operations required for embedding a logo into an image. In one example, toggling can be based on one or more techniques as generally known in the art, such as simple toggling of a single site or pair toggling of a master/slave site pair.

Figure 3:
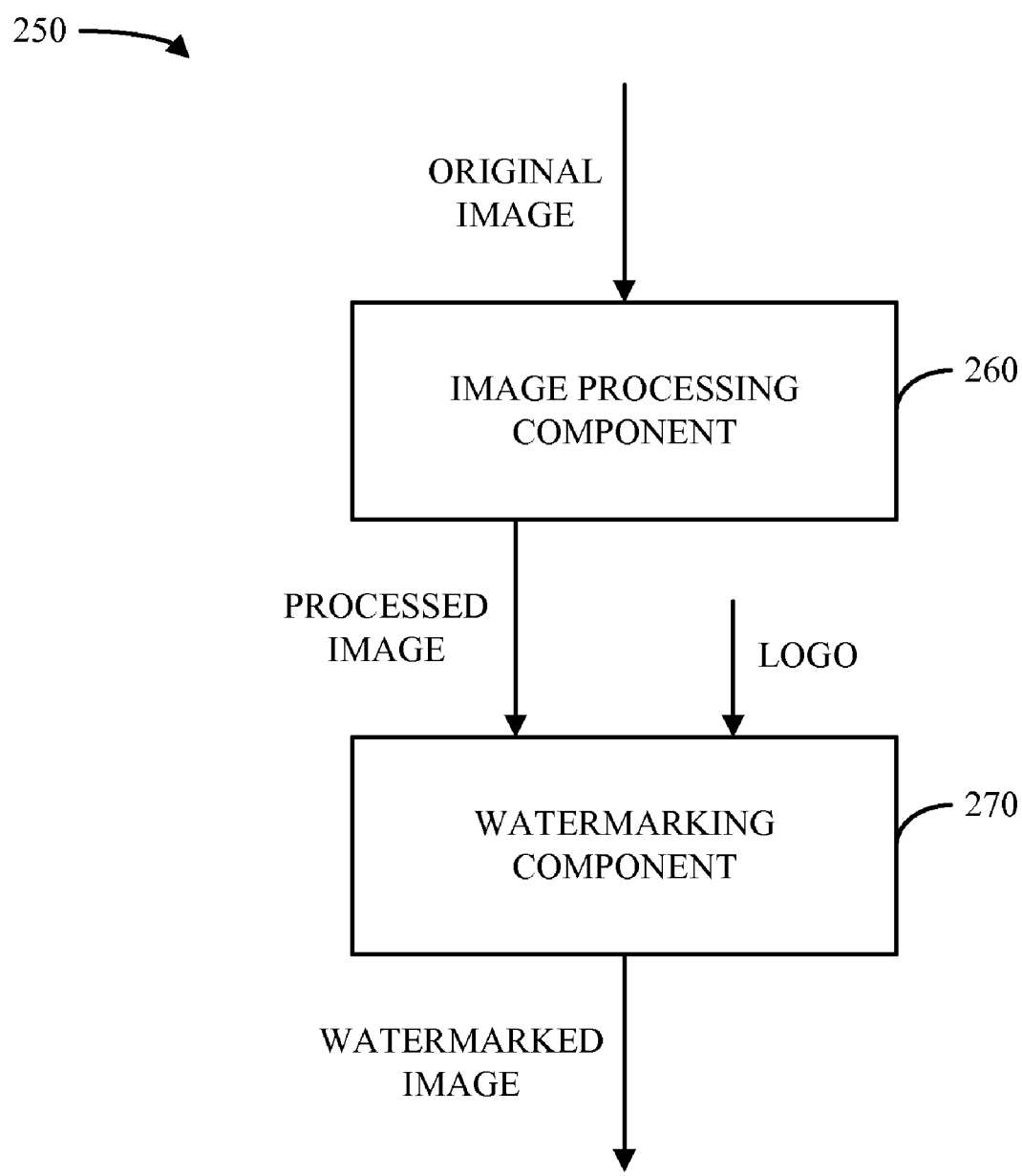

Turning to FIG. 3, a block diagram of another system 250 for embedding data in an image is illustrated. In accordance with one aspect, system 250 can include an image processing component 260, which can receive an original or host image and process the original image in various manners to produce a processed image. The processed image and a binary logo can then be provided to a watermarking component 270, which can function similarly to watermarking component 210 and/or in accordance with various aspects described infra to embed the binary logo in the processed image.

In one example, the watermarking component 270 can be operative to perform watermarking for a specific class of images, such as binary halftone images, and the image processing component 260 can receive an original image and process the image such that it conforms to the class of images on which the watermarking component 270 operates. In a specific, non-limiting example, the watermarking component 270 can be operative to embed a binary logo into a binary halftone image, and the image processing component 260 can receive a continuous or multitone image, such as a grayscale image or the like. In such an example, the image processing component 260 can convert the multitone image into a halftone image by, for example, converting pixels in the multitone image having a multitone value above a given threshold to a first halftone value and converting those having a multitone value below the threshold to a second halftone value. A binary logo can then be embedded in the resulting halftone image by the watermarking component 270 in accordance with various aspects provided herein.

In another specific, non-limiting example, the image processing component 260 can receive a color image into which a binary logo is to be embedded at the watermarking component 270. In such an example, the image processing component 260 can process an original color image in a variety of ways. For example, the image processing component 260 can divide an original color image into its individual color components, which can then be individually halftoned to create a series of color halftoned images. As a specific illustration, the image processing component in such an example can divide a color image into three images, which respectively contain only the red, blue, and green color components of the image. These component images can then be individually halftoned and provided to the watermarking component 270 for embedding data therein. As another example, the image processing component 260 can obtain binary values corresponding to colors and/or tones present at respective pixels in an original image. These binary values can then be provided to the watermarking component 270, which can subsequently embed watermark information into the binary color values that represent the respective pixels of the original image. As an additional example, the image processing component 260 can receive a few-color image, such as a cartoon image, into which a binary logo is to be embedded. The image processing component can then determine the set of colors present in the image and divide the identified colors into two sets such that colors in the first set represent a first binary bit and that colors in the second set represent a second binary bit. The few-color image and the color sets can then be provided from the image processing component 260 to the watermarking component 270, which can embed a binary logo into the image by toggling pixels having a color in the first color set to a selected color in the second color set, or vice versa, as necessary in accordance with various aspects described herein. Colors used for toggling within the color sets can be selected in any suitable manner.

It should be appreciated that the examples described above relative to the operation of FIG. 3 are provided by way of illustration only and are not intended to limit the scope of the hereto appended claims. It should further be appreciated that, while a set of examples are illustrated relative to the operation of system 250, said system could operate in any suitable manner to facilitate watermark insertion into an image.

Figure 4:
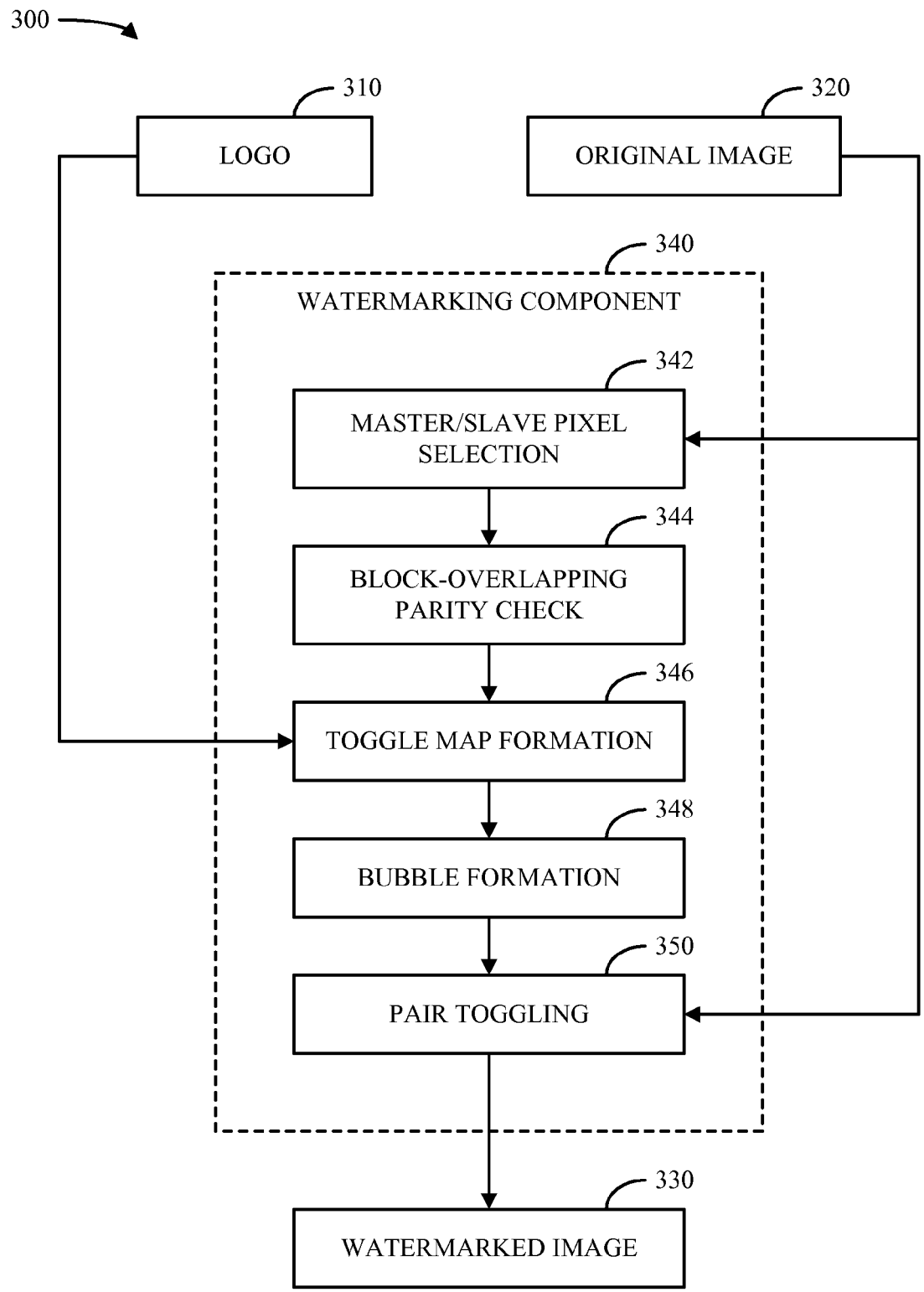
FIG. 4 is a block diagram of a system for performing an example technique for hiding data in a halftone image in accordance with various aspects described herein.

Turning now to FIG. 4, a block diagram of a system 300 for performing an example technique for hiding data in a halftone image in accordance with various aspects described herein is illustrated. In one example, a digital logo L 310 with a size of $L_X \times L_Y$ can be embedded into an original or host halftone image S 320 with a size of $S_X \times S_Y$ by a watermarking component 340 to form a watermarked halftone image W 330.

In accordance with one aspect, the watermarking component 340 can implement a BOPC algorithm for embedding a logo 310 into an original image 320. As illustrated by FIG. 4, the watermarking component 340 can implement a BOPC algorithm by utilizing subcomponents 342-350. First, an original image 320 can be provided to a master/slave pixel selection component 342 in order to identify candidate master and slave pixels in the original image 320 for embedding data corresponding to the logo 310. In one example, the master/slave pixel selection component 342 can select candidate pixels in the original image 320 in a similar manner to the conventional Data Hiding Smart Pair Toggling (DHSPT) algorithm. More particularly, like the DHSPT algorithm, the master/slave pixel selection component 342 can select a set of pseudo-random positions for hiding data. Further, the master/slave pixel selection component 342 can configure master and slave pixel sets such that if a master pixel in the original image 320 is toggled, a neighboring slave pixel with an opposite halftone value can also be forced to toggle in order to preserve local intensity and to provide good visual quality for a resulting watermarked image 330.

Unlike conventional algorithms such as DHSPT, however, the watermarking component 340 includes added features that borrow the strength of DHSPT while simultaneously improving performance. For example, master and slave pixel sets identified by the master/slave pixel selection component 342 can be provided to a block-overlapping parity check component 344, which can create data structures such as a master map and a parity map from the identified pixel sets to reduce the amount of toggling required for data hiding as compared to traditional data hiding techniques such as DHSPT. A toggle map formation component 346 can then be used to generate a toggle map for the original image 310 by comparing the parity map generated by the block-overlapping parity check component to the logo 310. Once a toggle map is generated, a bubble formation component 348 can process the toggle map to select locations at which smart pair toggling is to be applied in the original image 320. Finally, a pair toggling component 350 can be utilized to embed the logo 310 in the original image 320 to produce the watermarked image 330 by toggling the pixels of the original image 320 at the locations determined by the bubble formation component 348.

In accordance with one aspect, the watermarking component 340 can employ a BOPC algorithm for embedding a logo 310 into an image 320 as follows. First, the master/slave pixel selection component 342 can divide pixels in an original image S into groups of master and slave pixels. In one example, master pixels can be toggled by the pair toggling component 350 if necessary to store embedded logo data. When a master pixel is toggled, a neighboring slave pixel can additionally be toggled in a complementary manner to preserve local intensity in an image 320. By way of specific example, a pseudo-random number generator with a known seed K can be utilized by the master/slave pixel selection component 342 to generate a set of $(2L_X+1) \times (2L_Y+1)$ pseudo-random locations in an image S, which can then be utilized as master pixels. An example of master pixel selection is illustrated by host image 410 in FIG. 4. In accordance with one aspect, the pair toggling component 350 can toggle pairs of neighboring master pixels and slave pixels. Accordingly, master pixels can be selected by the master/slave pixel selection component 342 such that each master pixel is surrounded by eight slave pixels in its respective 3×3 neighborhood.

Figure 5:
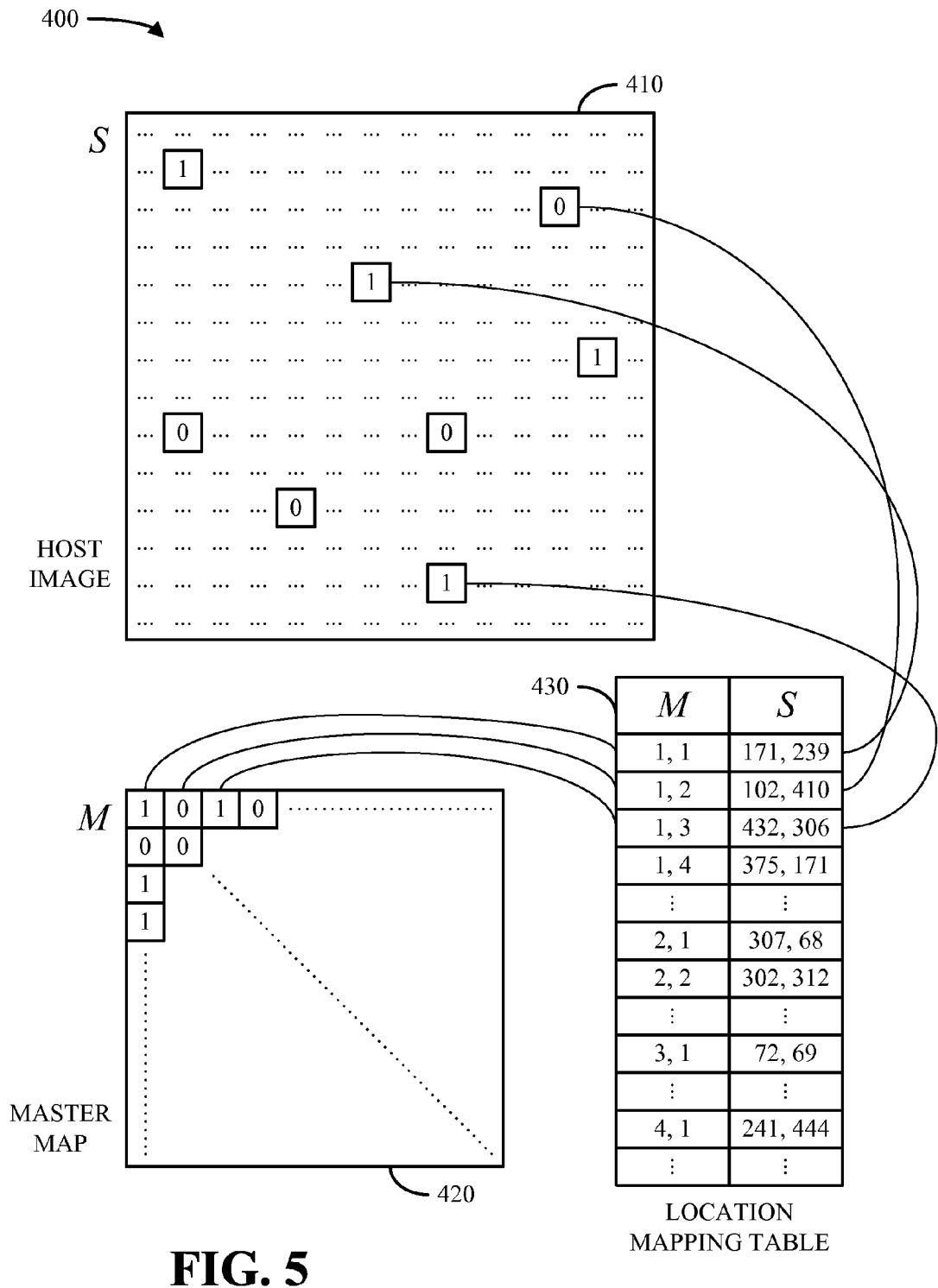
Figures 6, 7:
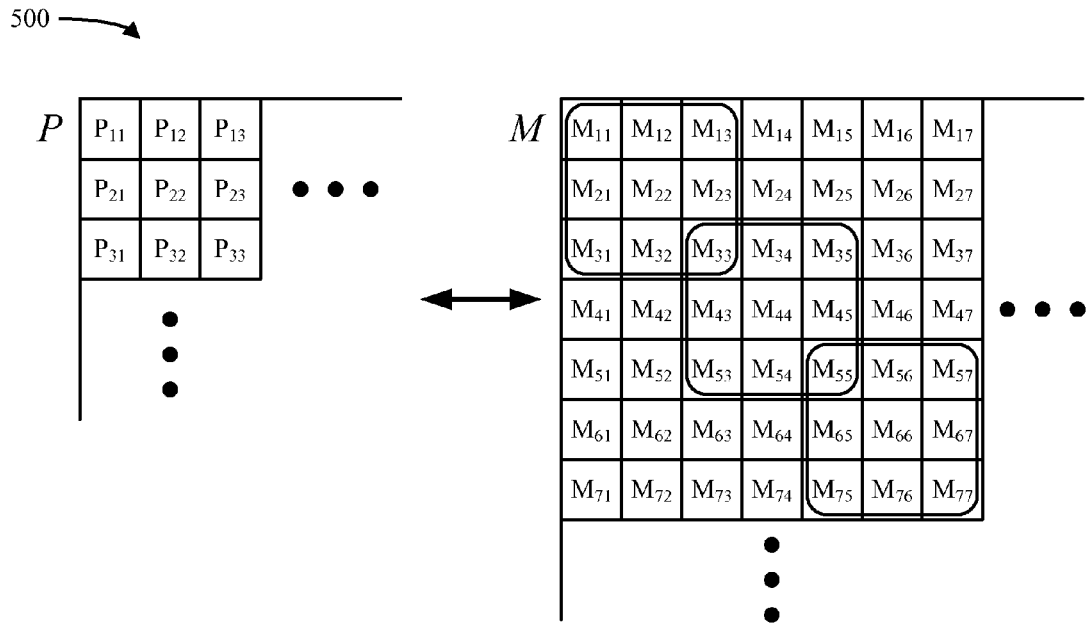

Based on master pixel locations determined by the master/slave pixel selection component 342, the block-overlapping parity check component 344 can group master pixels together to form a master map M. An example of a master map grouping is illustrated by master map 420 in FIG. 5. The block-overlapping parity check component 344 can then further store the locations of respective pixels in the master map 420 and the host image 410 in a location mapping table 430. Elements in a master map M can then be divided by the block-overlapping parity check component 344 into overlapping blocks as illustrated by diagram 500 in FIG. 6. While diagram 500 illustrates 3×3 blocks of master pixels, it should be appreciated that blocks created by the block-overlapping parity check component 344 can be any appropriate size. Further, blocks can be uniform or non-uniform in size.

In accordance with one aspect, the watermarking component 340 can hide one logo bit using the parity of a block in the master map M. Thus, a parity map P of size $L_X \times L_Y$ can be formed by the block-overlapping parity check component 344 as illustrated by diagram 500 according to the following equation:

$$I_{ij} = \left( \sum_{x=2i-1}^{2i+1} \sum_{y=2j-1}^{2j+1} M_{xy} \right) \bmod 2 \qquad (1)$$

Similarly, for extraction of a logo 310 from a watermarked image 330, a master map can be built by a pseudo-random number generator with the same seed K that was used for watermarking, and a parity map can again be formed based on Equation (1). Without any attack, it can be appreciated that the parity map generated during extraction should appear the same as the watermark input at the watermarking component 340.

In one example, based on a parity map P and a logo L 310, the toggle map formation component 346 can operate as follows. To embed a logo 310 into an image 320, it can be appreciated that the values of $P_{ij}$ should be toggled in locations where $P_{ij}$ is different from $L_{ij}$ such that the parity map P matches the logo L. Thus, a toggle map T can be formed by comparing performing pixelwise logical exclusive-OR (XOR) operations between P and L. These operations can be expressed as follows:

$$T_{ij} = P_{ij} \oplus L_{ij}. \tag{2}$$

It can be appreciated that if $P_{ij}$ and $L_{ij}$ are the same for some i and j, $T_{ij}$ will be zero and no toggling is required. On the other hand, if $P_{ij}$ and $L_{ij}$ are different, $T_{ij}$ will be equal to "1." As a result, one of the pixels in the block centered at $M_{(2i)(2j)}$ can be toggled by the pair toggling component 350 so that $P_{ij}$ equals $L_{ij}$.

In one specific, non-limiting example, all blocks in the master map M can be configured to overlap with their respective neighbors such that some master pixels can be shared by more than one block. Accordingly, for $1 \leq i \leq L_X$ and $1 \leq j \leq L_Y$, the number of blocks that share a master pixel at a given location is given by Table 1 as follows:

TABLE 1

Number of master map blocks sharing a master pixel by pixel location.

| Pixel Location | Number of Blocks |
|---|---|
| (2i, 2j) | 1 |
| (2i + 1, 2j)/(2i, 2j + 1) | 2 |
| (2i + 1, 2j + 1) | 4 |

In accordance with one aspect, a BOPC algorithm executed by the watermarking component 340 can utilize the pixel-sharing property illustrated by Table 1 in selecting pixels to toggle, thereby achieving improved visual quality. As can be observed from Table 1, a single toggling in a master map M corresponding to an image can result in the toggling of one, two, or four information bits in a parity map P. Thus, to minimize the amount of toggling required for embedding a logo 310, a bubble formation component 348 can be utilized as follows.

In one example, the bubble formation component 348 can form groups, or "bubbles," of like values in a toggle map T. Examples of bubble arrangements that can be utilized by the bubble formation component 348 are illustrated by diagram 600 in FIG. 7. Initially, every location in a toggle map T having a value of "1" can be initialized as an elementary bubble with a size of 1×1. Following this operation, neighboring bubbles can be merged together to form respective complex bubbles. Examples of allowable arrangements for these complex bubbles are illustrated in diagram 600. In accordance with one aspect, the bubble formation component 348 can operate with the goal of enclosing all of the "1" values in a toggle map T using the least amount of bubbles. In one example, elements of T can be updated as they are respectively enclosed in bubbles to reflect the group number corresponding to the bubble type in which they have been enclosed. An example of this process is illustrated by diagram 700 in FIG. 8.

In another example, the bubble formation component 348 can utilize a two-pass approach to achieve a small number of bubbles with low computational complexity as follows. In the first pass, a toggle map T can be scanned in raster-scan order. In this pass, any bubbles belonging to group 4 as shown in diagram 600 (e.g., 2×2 groups of neighboring "1" values) can be marked with the value "4." In the second pass, the toggle map T can then be scanned in raster-scan order again. If an element $T_{ij}$ is found to have a value of "1" and can be grouped into either a group 2 or group 3 bubble as shown in diagram 600, the number of consecutive "1" values vertically downward from $T_{ij}$ and horizontally rightward from $T_{ij}$ can be checked. In one example, if the vertical run is found to be even and horizontal run is found to be is odd, $T_{ij}$ can be grouped into a group 2 bubble. Otherwise, a group 3 bubble can be used.

It should be appreciated that the expected number of bubbles per embedded bit is related to the size of a logo 310 to be embedded. It can further be appreciated that the expected number of bubbles can decrease under, for example, two conditions. First, the expected number of bubbles can decrease if the dimensions of an image 320 into which a logo 310 is to be embedded increase in one or more directions. This condition is due to the fact that as the number of elements present in a toggle map T increases, it because more likely that small bubbles will merge to form larger ones. Second, the expected number of bubbles can decrease for a given watermark payload if the difference between the dimensions of the image 320 increases. This condition holds due to the fact that a large difference between image dimensions favors the merging of bubbles by providing more interior edges. In accordance with one aspect, each bubble represents a pair toggling in the host image 320, which as noted supra can lead to a drop in visual quality in a watermarked image W 330. In the conventional DHSPT algorithm, for example, the expected number of toggling operations required per embedded bit is 0.5. However, by utilizing block parity and bubble formation, the BOPC algorithm can reduce the expected number of toggling operations (e.g., bubbles) per embedded bit for a 128×128 logo to 0.26.

After bubble formation via the bubble formation component 348, smart pair toggling can be performed by the pair toggling component 350 to complete the watermarking process as follows. After the bubble formation process, After the bubble formation process, it can be appreciated that the number of bubbles in a toggle map T represents the number of pixel toggling operations required in a corresponding master map M. In one example, $T_{ij}$ can represent the first element in raster-scan order of a bubble in the toggle map T. Based on $T_{ij}$, a master pixel can be chosen by the pair toggling component 350 based on the bubble group to which $T_{ij}$ belongs as shown in Table 2 below:

TABLE 2

Selected master pixel locations for toggling by bubble group.

| Group | Pixel location |
|---|---|
| 1 | $M_{2i, 2j}$ |
| 2 | $M_{2i+1, 2j}$ |
| 3 | $M_{2i, 2j+1}$ |
| 4 | $M_{2i+1, 2j+1}$ |

Figures 8, 9:
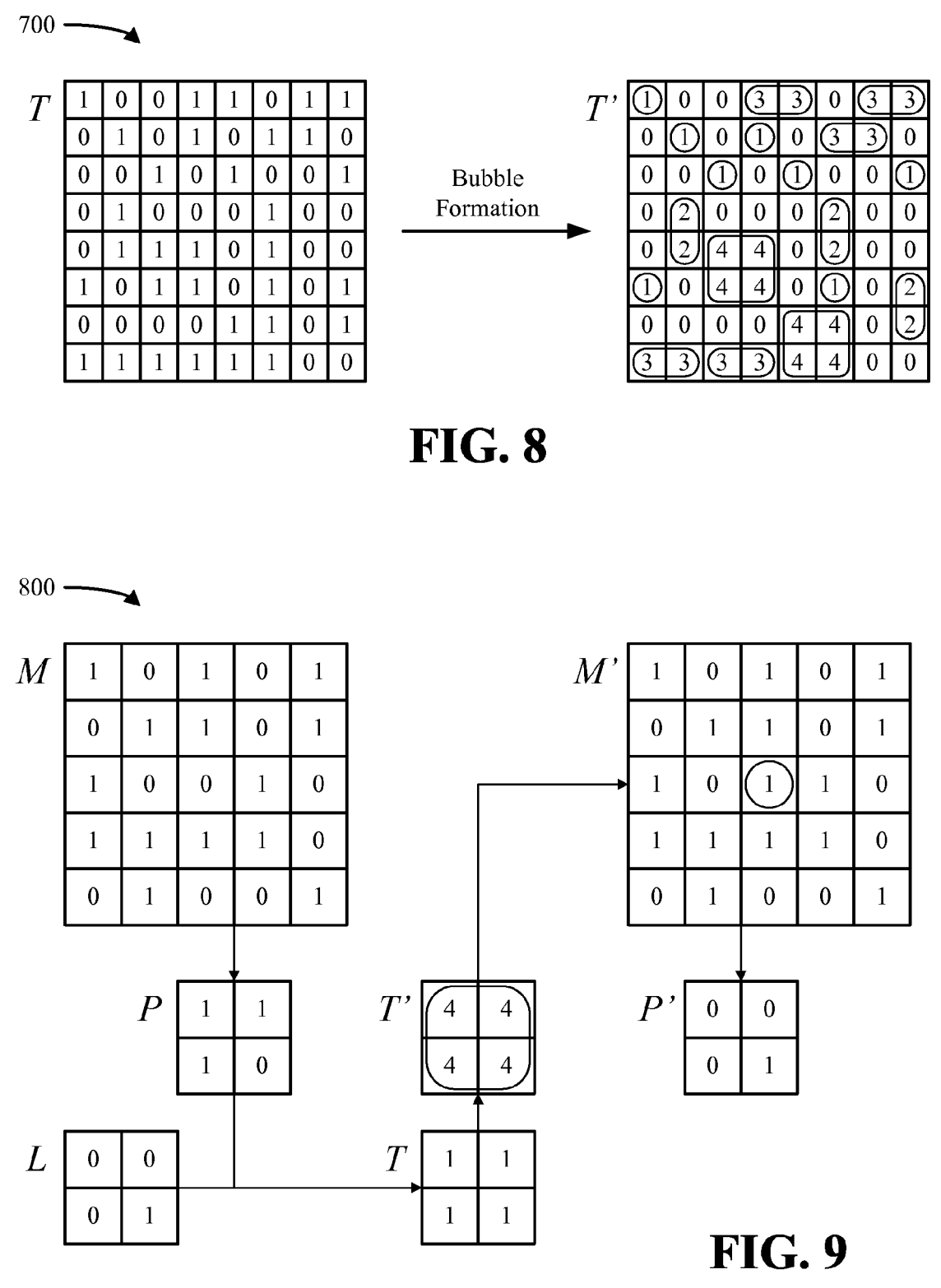

An example toggling operation is illustrated by diagram 800 in FIG. 9. As diagram 800 illustrates, after finding all master pixel locations in a host image 320 to be toggled, smart pair toggling can be performed on the host image 320. In one example, toggling performed by the pair toggling component 350 can be subject to a constraint that a complementary toggling partner must appear in the slave pixel group for a toggled master pixel.

Figure 10:
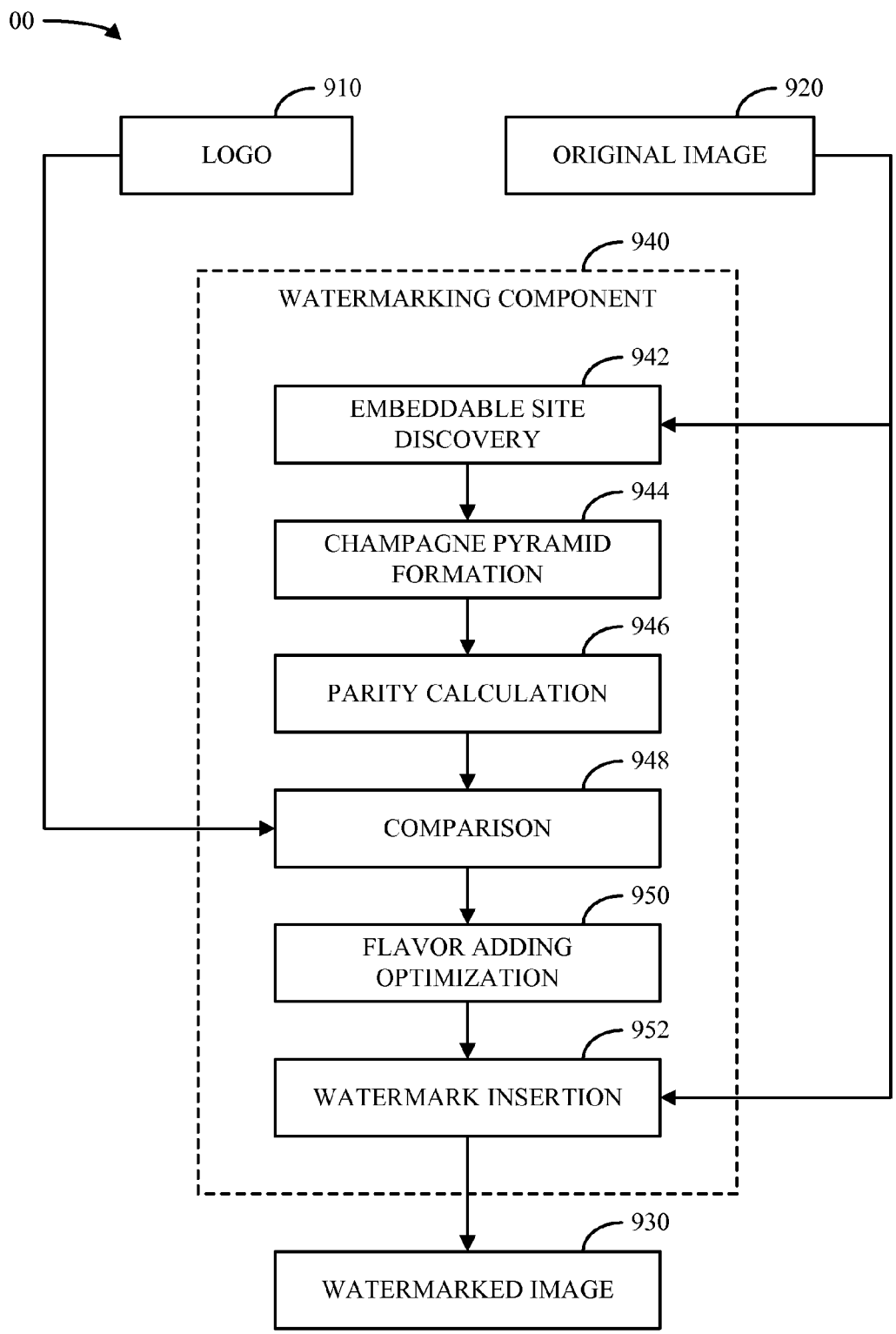
FIG. 10 is a block diagram of a system that implements an example technique for embedding a binary logo in an image in accordance with various aspects described herein.

Turning now to FIG. 10, a block diagram of a system 900 that implements an example technique for embedding a binary logo 910 in an image 920 in accordance with various aspects described herein is provided. In one example, a binary logo 910 can be embedded into an original or host image 920 by a watermarking component 940 to form a watermarked halftone image 930. In accordance with one aspect, the watermarking component 940 can implement a CPPC algorithm for embedding the logo 910 into the original image 920 by utilizing subcomponents 942-952.

In accordance with one aspect, the CPPC algorithm can be utilized by the watermarking component 940 to improve the visual quality of a watermarked image 930 by reducing the total number of locations in an original image 920 that are required to be changed during the watermark insertion process. In one example, the CPPC algorithm can be used in combination with a conventional data hiding and/or watermarking algorithm to embed logos 910 into digital images 920. More particularly, the CPPC algorithm can be utilized to improve upon such conventional techniques, thereby improving the visual quality of a resulting watermarked image 930.

The watermarking component 940 can extend the functionality of traditional data hiding and/or watermarking techniques by borrowing the functionality of various elements of such techniques and applying additional elements to improve their performance. By way of specific, non-limiting example, the watermarking component 940 can utilize three steps that can generally be found in conventional watermarking algorithms. First, the watermarking component 940 can include an embeddable site discovery component 942, which can searches in a host image 920 in a target domain for locations within the host image 920 that are suitable for the embedding process. As used herein, these locations are referred to simply as "embeddable locations." Second, the watermarking component 940 can then classify the halftone values of the embeddable locations into groups. For example, locations having a halftone value of "0" can be classified into a first group while locations having a halftone value of "1" can be classified into a second group. Third, a comparison component 948 and/or a watermark insertion component 952 can be utilized to force the identified embeddable locations in the original image 920 to contain the same values as corresponding information bits in the logo 910.

In accordance with one aspect, the watermarking component 940 can utilize a CPPC algorithm to extend the functionality of such conventional techniques by employing three additional subcomponents. First, a champagne pyramid formation component 944 can be utilized after the searching of all embeddable locations available in a host image 920. Following champagne pyramid formation, a parity calculation component 946 can be used to identify array of information bits corresponding to embeddable locations in the host image 920 with the same size as that of the logo 910. After comparing the identified array to the logo, a flavor adding optimization component 950 can be utilized to find a minimum number of locations that must be toggled to cause the identified array of information bits to match the logo 910. Watermark insertion can then be processed via the watermark insertion component 952 on the locations marked by the flavor adding optimization component 950. The operation of the champagne pyramid formation component 944, the parity calculation component 946, and the flavor adding optimization component 950 will now be described in further detail.

Figure 11:
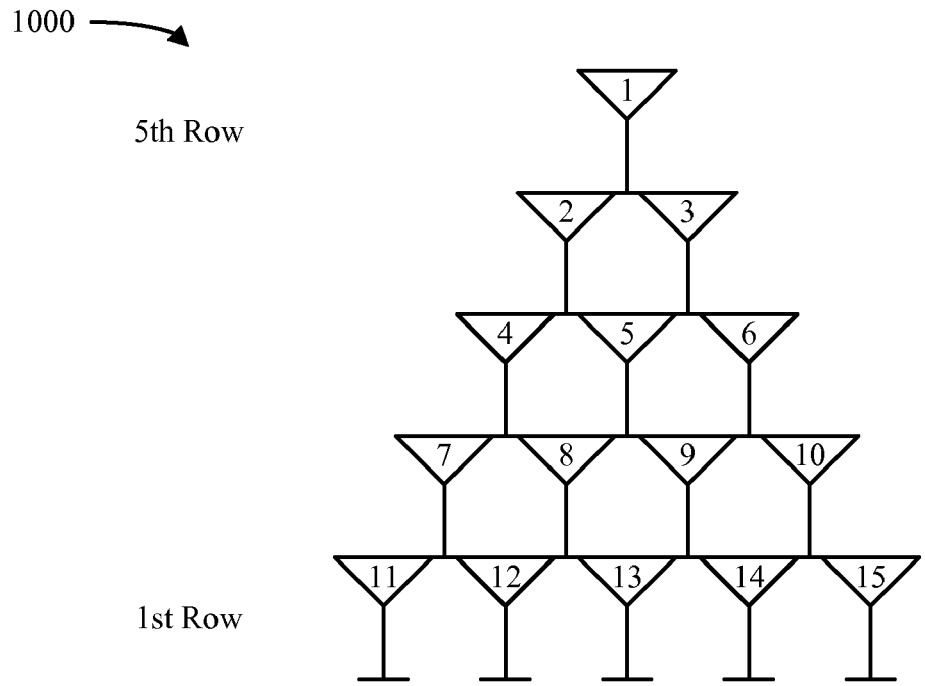
FIGS. 11-13 illustrate example data structures that can be utilized in connection with one or more data embedding techniques described herein.

In accordance with another aspect, the Champagne Pyramid Parity Check algorithm usable by the watermarking component 940 is so named because it leverages various properties that can be observed in a champagne pyramid. For example, a two-dimensional 5-level champagne pyramid 1000 built by 15 wine glasses numbered 1 through 15 is illustrated by FIG. 11. It can be appreciated that, if champagne is poured into the highest glass in the pyramid 1000, the champagne will fill all glasses below the highest glass as it overflows down the pyramid 1000. Similarly, in a more complicated scenario, flavorless champagne can be poured into glass 1 at the top of the pyramid 1000 while apple-flavored champagne can be poured into glass 4. It can be appreciated that, as time elapses while pouring continues, all of the glasses in the pyramid 1000 will come to be filled with champagne. However, considering the glasses at the bottom row of the pyramid 1000, it can be appreciated that glasses 11 through 13 would contain apple-flavored champagne at such a time while glasses 14 and 15 would not.

Based on these observations, the rows of the pyramid 1000 can be numbered from the bottom. As illustrated in FIG. 11, glasses 11 through 15 are on the first row and glass 1 is on the fifth row. Thus, for a pyramid 1000 with L levels, N successive glasses on the bottom row of the pyramid 1000 will contain the same flavor of champagne as a glass on the N-th row of the pyramid 1000 if champagne is poured into said glass until it has run off into the bottom row of the pyramid 1000. As a result, it can be appreciated that if it is desired to add a common flavor into N successive glasses on the bottom row, the desired flavor can be poured into a single glass on the N-th row of the pyramid 1000 instead of adding the flavor on the bottom row for all N glasses.

Similarly, the champagne pyramid formation component 944 can arrange embeddable locations into a structure that exhibits the above properties. In one example, the champagne pyramid formation component 944 can take as input a set of embeddable locations identified by the embeddable site discovery component 942 and their corresponding binary values. Each of these locations can then be treated as a wine glass in a pyramid structure having a predefined scanning order. An example of such a structure is illustrated by diagram 1100 in FIG. 12. As diagram 1100 further illustrates, the number of information bits that can be held by a champagne pyramid structure is equal to the number of elements on the bottom row of the pyramid. Thus, as the number of embeddable locations (e.g., M) in an image 920 is limited and the size of a logo 910 to be embedded (e.g., L) are fixed, the number of embeddable locations in the image 920 may not be sufficient to build a single L-level champagne pyramid. In such cases, multiple N-level pyramids can be built instead. In one example, N can be constrained by the following equation:

$$\frac{N(N+1)}{2} \cdot \frac{L}{N} \leq M \qquad (3)$$

$$N \leq \frac{2M}{L} - 1.$$

In accordance with one aspect, hidden information embedded into an image 920 using CPPC can be dependent on the bottom row of the pyramid structure(s) constructed by the champagne pyramid formation component 944. As described above with respect to diagram 1000, data flow through the structure can be visualized as liquid poured from the top of a champagne pyramid such that eventually all glasses on the bottom row of the pyramid are filled up. Thus, the parity calculation component 946 can begin processing of a pyramid structure(s) by defining the Region of Interest of a wine glass n, ROI(n), as the set of glasses that belong to the possible paths from the top glass of the pyramid to glass n. Thus, for pyramid 1000, ROI(11)={1, 2, 4, 7, 11} and ROI(13)={1, 2, 3, 4, 5, 6, 8, 9, 13}.

Figure 12:
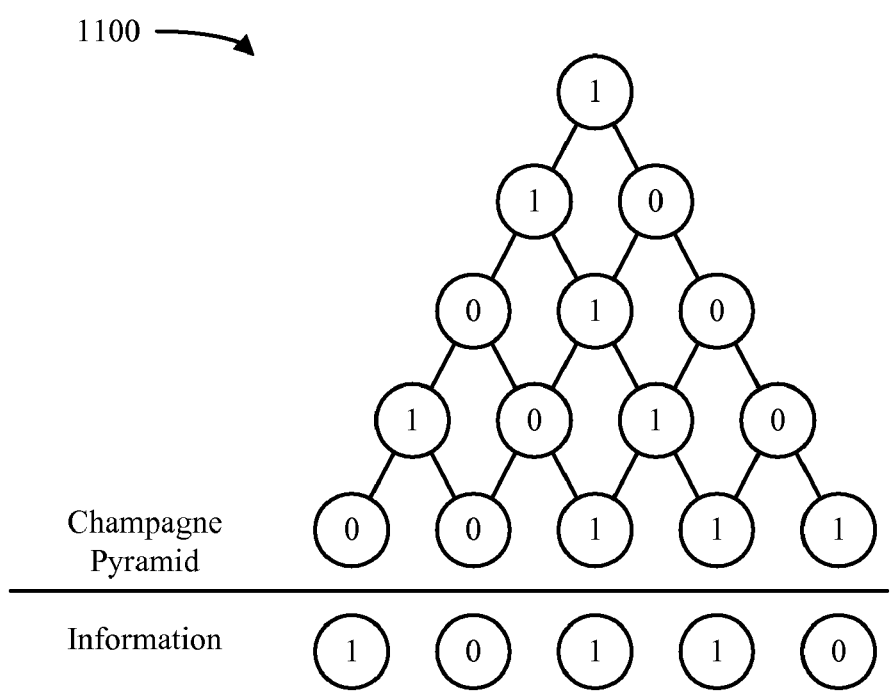

As noted previously, each wine glass in pyramid 1000 can represent an embeddable location in an image 920 and its corresponding binary value. Thus, each wine glass in the pyramid 1000 can contain a value of either "0" or "1." Based on this, the parity calculation component 946 can count the number of glasses containing "1" in the region of interest of each glass on the bottom row of the pyramid. In one example, if the number of such glasses is an even number for a glass, the parity of that glass is set to "0." Similarly, if the number of such glasses is an odd number for a given glass, the parity of that glass can instead be set to "1." After this calculations, an information array (IA) with the same size as a logo 910 to be embedded can be formed. Diagram 1100 in FIG. 12 illustrates example parity calculations.

Figure 13:
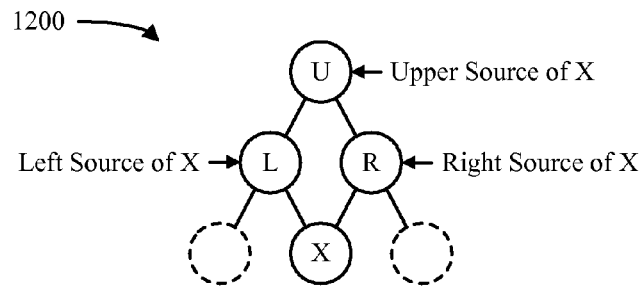

In one example, for each node on the bottom row of a pyramid structure, the parity calculation component 946 can define the ROI and then count the number of nodes containing a value of "1" in the defined region. By way of specific, non-limiting example, the computational complexity of such operations can be reduced by making use of various properties of the ROI. First, for each node x on the bottom row of a pyramid structure, the parity calculation component can define the "left source" of x, LS(x), the "right source" of x, RS(x), and the "upper source" of x, US(x), as illustrated in diagram 1200 in FIG. 13. It should be appreciated that for some cases, LS(x), RS(x), and/or US(x) may not exist.

The ROI of a non-existing node can be represented as an empty set. Otherwise, for a node x, ROI can be calculated as follows:

$$ROI(US(x))=ROI(LS(x)) \cap ROI(RS(x)), \quad (4)$$

$$ROI(x)=ROI(LS(x)) \cup ROI(RS(x))+\{x\}=ROI(LS(x))+ROI(RS(x))-ROI(US(x))+\{x\} \quad (5)$$

Based on the ROI of a node x as calculated in Equations (4)-(5), the parity of a node x can be calculated as follows:

$$\text{Parity}(x)=\text{Parity}(LS(x)) \oplus \text{Parity}(RS(x)) \oplus \text{Parity}(US(x)) \oplus x. \quad (6)$$

Figure 14:
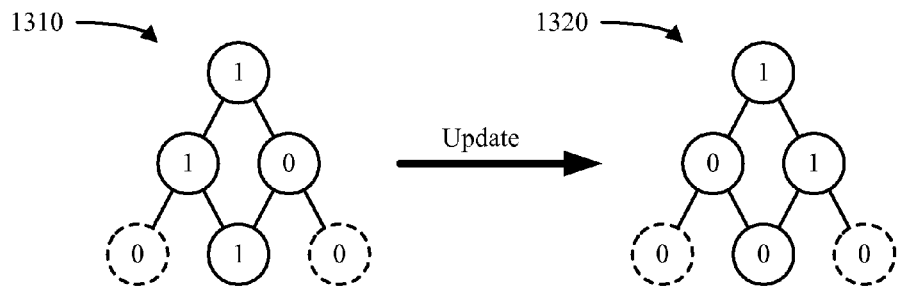
FIGS. 14-15 illustrate example update and toggle operations that can be performed in connection with one or more data embedding techniques described herein.

Thus, from Equation (6), the parity calculation component 946 can utilize a smart parity calculation method as follows. The parity calculation component 946 can start from the top of the pyramid and process each node in increasing order of glass number, as shown in diagram 1000. If US(x) is "0," for a given node, no further operation is needed. Otherwise, the values contained by of LS(x), RS(x), and x can be toggled as illustrated by diagrams 1310 and 1320 in FIG. 14.

Upon generation of an IA at the parity calculation component 946, the IA can be process with an array corresponding to the logo 910 being embedded using an exclusive-OR (XOR) operator at the comparison component 948. For each value of "1" that appears in the resulting array, the corresponding location on the bottom row of the pyramid structure can be marked as "To Be Flavored" (TBF), as illustrated in diagram 1410 in FIG. 15. Theoretically, it can be appreciated that a node on the bottom row of the pyramid will be marked as TBF with a probability of 0.5. Toggling optimization can then be performed by the flavor adding optimization component 950 by employing the observation that adding flavor into N successive wine glasses on the bottom row of a champagne pyramid is equivalent to adding flavor into one wine glass on the N-th row. Thus, if N successive nodes in a pyramid structure are marked as TBF, the flavor adding optimization can designate only one location in the host image 920 for toggling instead of requiring toggling of all N locations.

Figure 15:
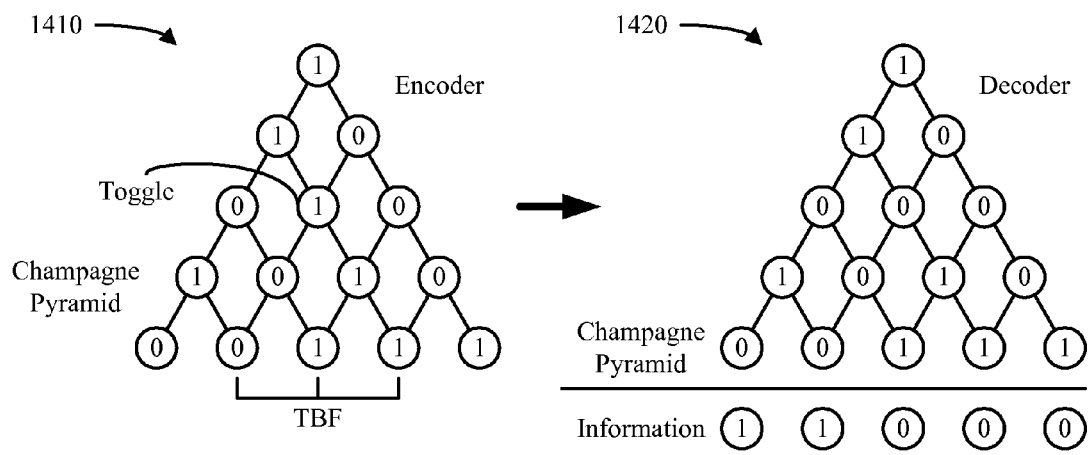

An example of the flavor adding optimization used in connection with watermark insertion and extraction is illustrated by diagrams 1410 and 1420 in FIG. 15. As FIG. 15 illustrates, given the pyramid structure 1100 illustrated in FIG. 12 and a 5-bit logo {11000}, toggling of the IA can be performed to obtain a resulting array of {01110} As illustrated by diagram 1410, the second, third, and fourth nodes on the bottom row 1410 can then be marked as TBF. Instead of toggling all three glasses, however, the watermarking component 940 can fully embed the logo by toggling only one glass on the third row.

Figure 16:
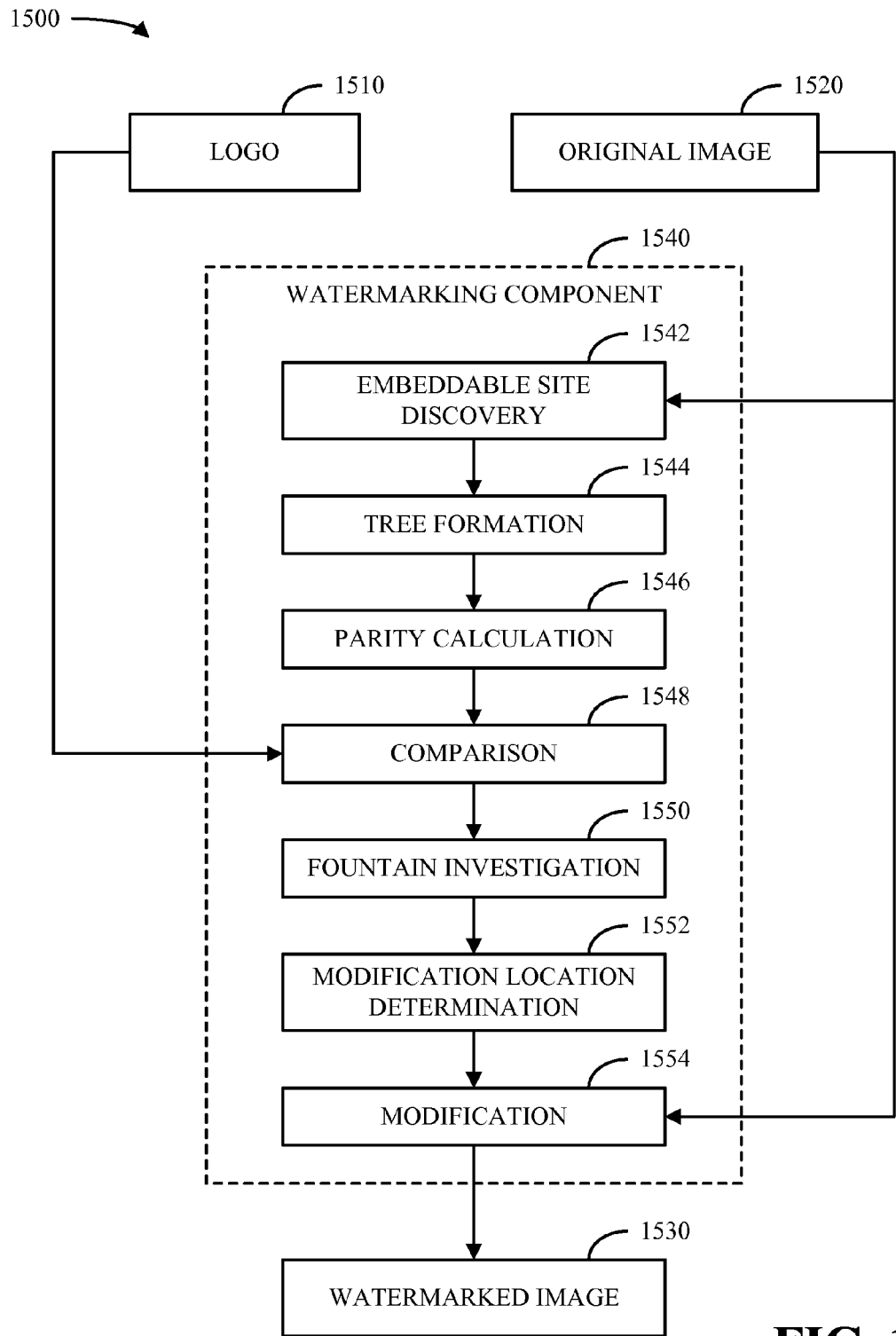
FIG. 16 is a block diagram of a system that facilitates watermarking of an image in accordance with various aspects described herein.

Referring next to FIG. 16, a system 1500 that facilitates watermarking of an image 1520 in accordance with various aspects described herein is illustrated. In one example, a binary logo 1510 can be embedded into an original halftone image 1520 by a watermarking component 1540 to form a watermarked halftone image 1530. In accordance with one aspect, the watermarking component 1540 can implement a TBPC algorithm for embedding a logo 1510 into an original image 1520 by utilizing subcomponents 1542-1554.

In accordance with one aspect, a TBPC algorithm can be utilized by the watermarking component 1540 as a plug-in process for an existing data hiding technique. Thus, for example, the watermarking component 1540 can perform various acts that can generally be found in conventional watermarking algorithms. For example, the watermarking component 1540 can utilize an embeddable site discovery component 1542 to search for embeddable sites in a host image 1520, a comparison component 1548 for comparing binary values contained in the embeddable sites with corresponding to-be-embedded data, and a modification location determination component 1552 for deciding which embeddable sites need modifications to hold the to-be-embedded data. Modification can then be performed based on the comparisons via a modification component 1554. It can be appreciated that distortion is introduced into a watermarked image 1530 when an original image 1520 is modified. Further, it can be appreciated that as no prior information is known, the values contained in the embeddable sites can be considered to be independent to the to-be-embedded data. Thus, for every single to-be-embedded bit, the probability that the original image will require modification is 0.5. Most conventional data hiding algorithms attempt to minimize the distortion created by these modifications. In contrast, the TBPC algorithm usable by the watermarking component 1540 attempts to reduce the probability of modifying the original image 1520.

In accordance with one aspect, the watermarking component 1540 can utilize the TBPC algorithm to achieve an improvement in the visual quality of a watermarked image 1530. In one example, the watermarking component 1540 can employ a tree formation component 1544, a parity calculation component 1546, and/or a fountain investigation component 1550 to extend the functionality of a traditional data hiding scheme by way of the TBPC algorithm. In general, the TBPC algorithm can allow the watermarking component 1540 to utilize relationships among ancestors and descendants in an N-ary tree to improve the visual quality of a watermarked image 1530. The following discussion describes example operation of the tree formation component 1544, parity calculation component 1546, and fountain investigation component 1550 in further detail. As used herein, the size of a logo to be embedded is represented as L.

Figure 17:
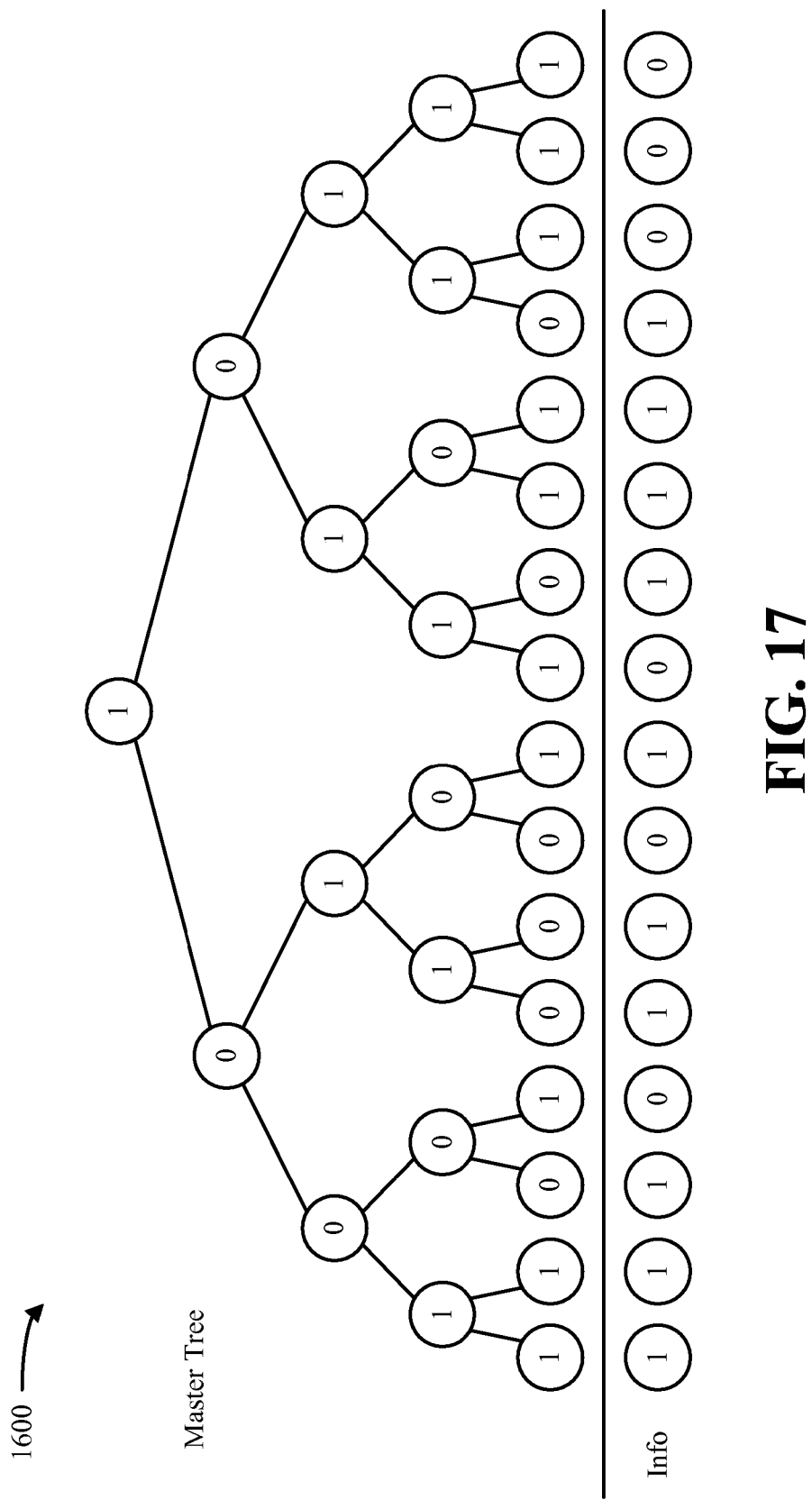
FIG. 17 illustrates an example data structure that can be utilized for one or more watermarking techniques described herein.

By way of example, the tree formation component 1544 can operate as follows. In conventional data hiding algorithms, after finding the embeddable sites of an image, the values of these locations can be classified as either "0" or "1." Immediately after classification, these values are compared with corresponding logo bits. If respective values are the same as a to-be-embedded bit, no further operations are performed. Otherwise, one or more distortion-creating processes are carried out to toggle the value. In contrast, the tree formation component 1544 can populate an N-ary complete tree, herein referred to as a "master tree," with the values of embeddable locations discovered by the embeddable site discovery component 1542. Because the master tree is an N-ary complete tree, every node of the master tree, except for leaf nodes, can be configured to have N child nodes. In one example, one leaf node can be utilized to hold one information bit. Accordingly, it can be appreciated that to embed a logo 1510 of L bits, a master tree can be required to have L leaves. FIG. 17 illustrates an example master tree 1600 that can be created by the tree formation component 1544 for N=2 and L=16.

Based on a master tree constructed by the tree formation component 1544, a parity calculation component 1546 can be utilized to determine the information bits represented by each leaf node in the master tree. In one example, this can be accomplished for a leaf node by traveling from the leaf node to the root node of the master tree. If the number of occurrences of "1" values is an odd number, the information bit of the leaf node can be regarded as "1." Otherwise, the information bit can be regarded as "0." These calculations are further illustrated in FIG. 17 for master tree 1600.

Figure 18:
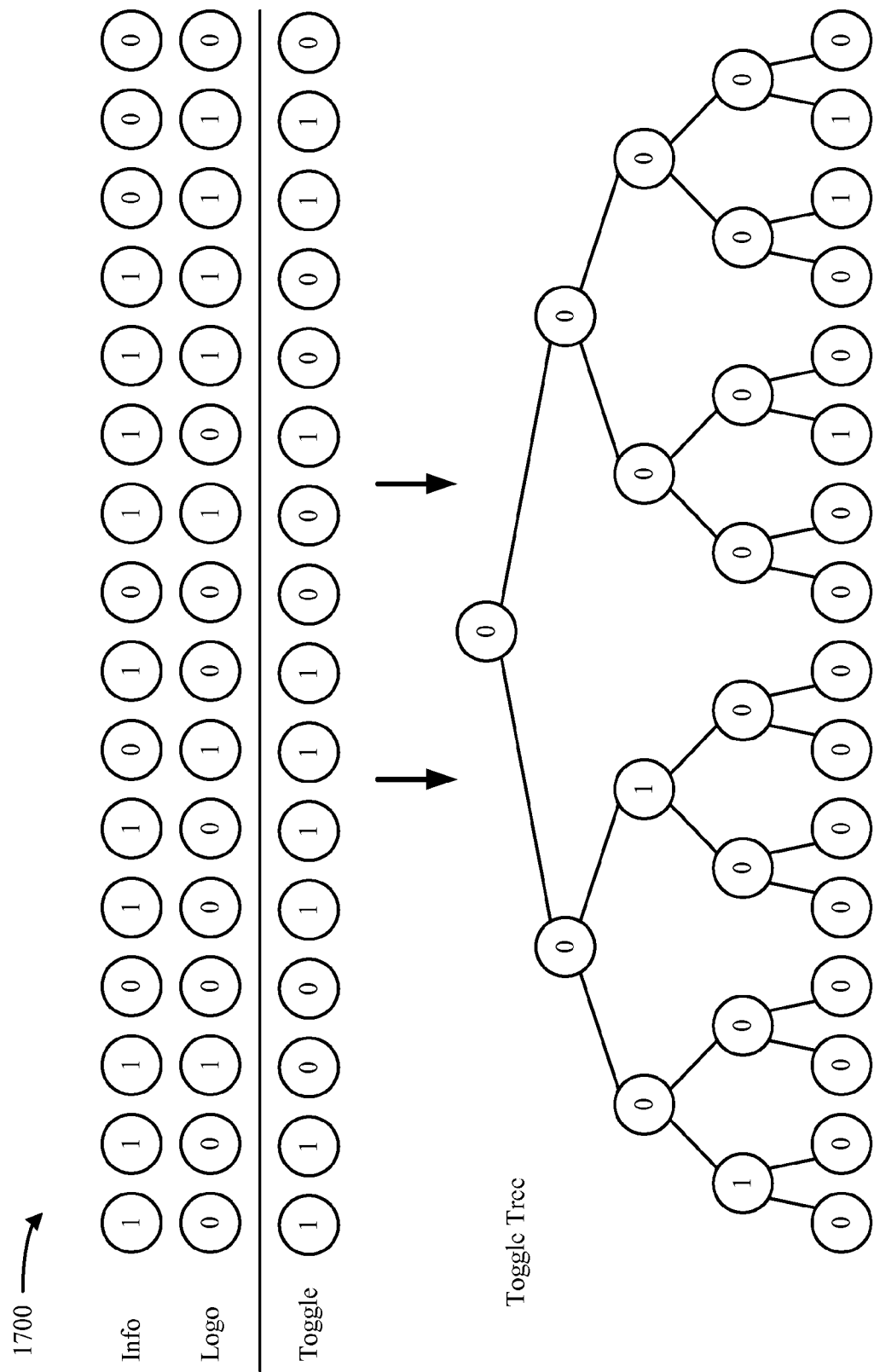
FIGS. 18-19 illustrate respective operations that can be performed in connection with one or more watermarking techniques described herein.

Next, by performing bitwise logical exclusive-OR (XOR) operations between respective bits of the logo 1510 and the information carried by the master tree, the comparison component 1548 can obtain a toggle array. As an example of this comparison, it can be observed that for the example master tree 1600, the obtained information array is {1110110101111000}. Assuming a logo array of {0010001001011110}, a resultant toggle array obtained by the comparison component 1548 becomes {1100111100100110}. This comparison is illustrated by diagram 1700 in FIG. 18.

In accordance with one aspect, respective values of "1" in the toggle array can represent the fact that the corresponding embeddable locations of the original image 1520 require toggling. However, it can be appreciated that visual artifacts are introduced by any single modification in the original image 1520. Accordingly, to improve the visual quality of a watermarked image 1530, TBPC can be utilized to minimize the number of "1" values in the toggle array. Referring back to FIG. 17, when the master tree 1600 is carefully examined, it can be observed that a single change in any node, either from "1" to "0" or from "0" to "1," can result in a change in the parity of all of the descendants of the changed node. Thus, instead of changing the values of N sibling nodes in the master tree 1600, a single change in their common parent node can give the same effect.

To leverage the above observation, a fountain investigation component 1550 can build a toggle tree with the same size as the master tree. In one example, the leaf nodes of the toggle tree can be populated by the elements of the toggle array in the order that the elements appear in the toggle array. The remaining nodes in the tree can be initially populated using any suitable value. In one example, the fountain investigation component can then begin analysis at the root of the toggle tree as follows. For a given node, if all N of the child nodes of the given node contain the value "1," the child nodes are updated with the value "0" and the node being examined can be set to "1." Otherwise, the node being processed can be reset to "0." An example toggle tree generation and fountain investigation process for the example toggle array given above is illustrated in diagram 1700.

Figure 19:
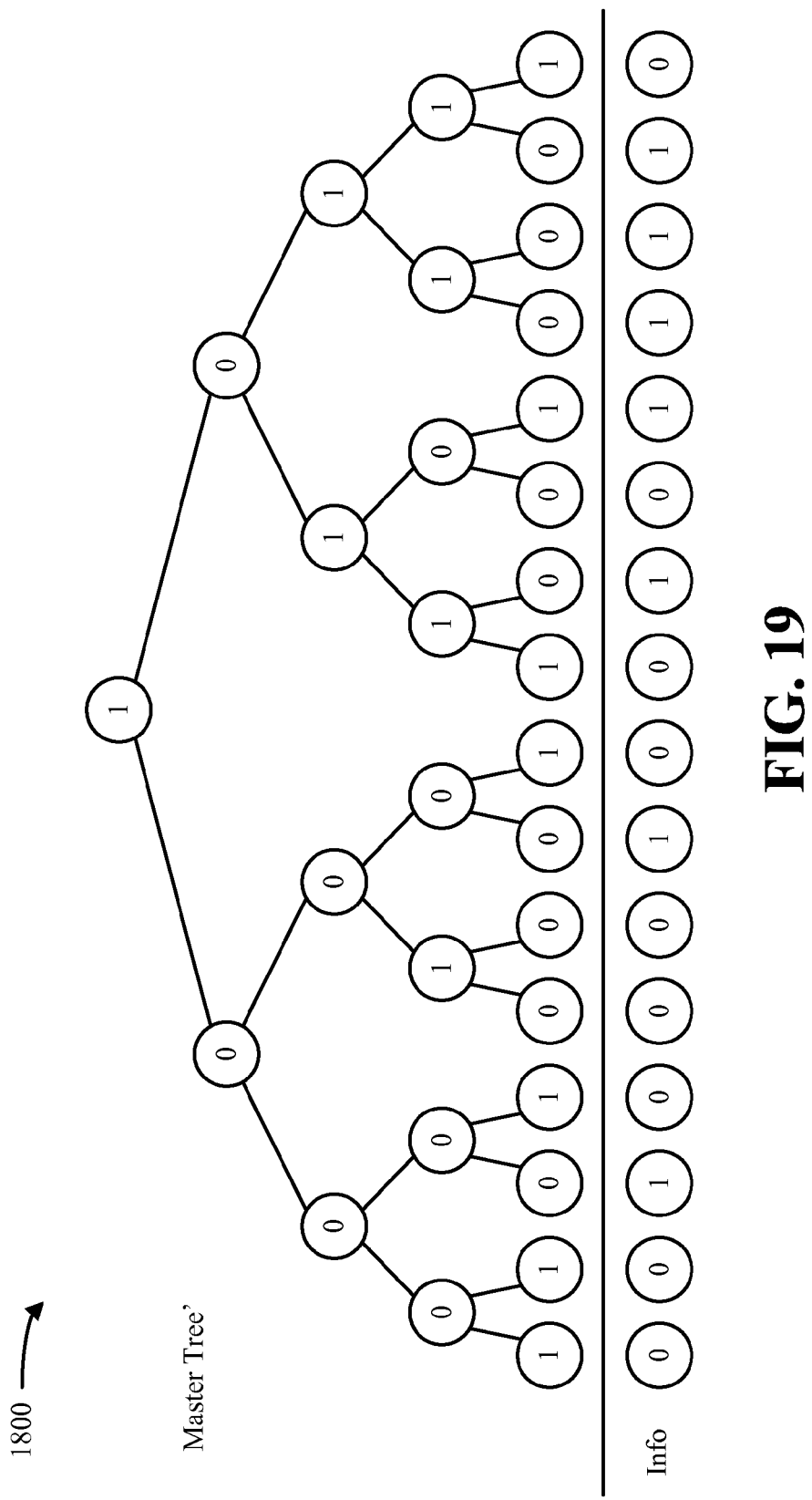

In one example, to embed the logo 1510 into the original image 1520, the embeddable sites in the master tree corresponding to locations in the toggle tree that have respective values of "1" can then be toggled. To decode a watermarked image 1530 generated in this manner, the same sequence of embeddable sites can then be searched and used to build a master tree. After parity calculation for the master tree, the obtained information array should match the logo array corresponding to the embedded logo 1510. An example decoding process is illustrated by diagram 1800 in FIG. 19.

In accordance with one aspect, the maximum achievable payload of the watermarking component 1540 can be found as follows. Initially, it can be appreciated that because the number of embeddable sites in an original image 1520 is limited, the size of a master tree that can be formed in the tree formation process is also limited. Further, as noted above, the master tree is required to have L leaf nodes to represent L logo bits. Thus, to form an N-ary complete tree with L leaf nodes, the total number of nodes required, nNodes, can be found by the following equation:

$$nNodes = 1 + N + N^2 + \ldots + N^x, \quad (7)$$
where
$$x = \log_N(L)$$
$$= \sum_{i=0}^{x} N^i$$
$$= \frac{NL - 1}{N - 1} \quad \because N^x = L$$

$$\approx \left(\frac{N}{N-1}\right)L \quad \because NL \gg 1. \quad (8)$$

From Equation (8), it can be observed that as N increases, the number of nodes required in the master tree decreases. Thus, because the number of embeddable sites is limited, the payload that can be embedded by the watermarking component 1540 increases as N increases. For a fixed logo size L and available number of embeddable locations M, the minimum N that can be used can be found as follows:

$$M \geq \frac{NL - 1}{N - 1} \quad (9)$$

$$N \geq \left\lceil \frac{M-1}{M-L} \right\rceil \quad (10)$$

In accordance with another aspect, the parity calculation component 1546 can operate using a low-complexity parity calculation technique as follows. First, parity(x) can be defined as the parity of the number of occurrences of "1" in the path from a node x to the root node of a master tree. It can be observed that parity(x) is equal to the value of parity (parent(x)) plus the value of node x using bitwise addition. Thus, the parity calculation component 1546 can traverse the master tree starting from the root of the tree and, for each node x being processed, update the parity of its child node y by adding the parity of node x and the value of node y.

Referring now to FIGS. 20-23, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 20:
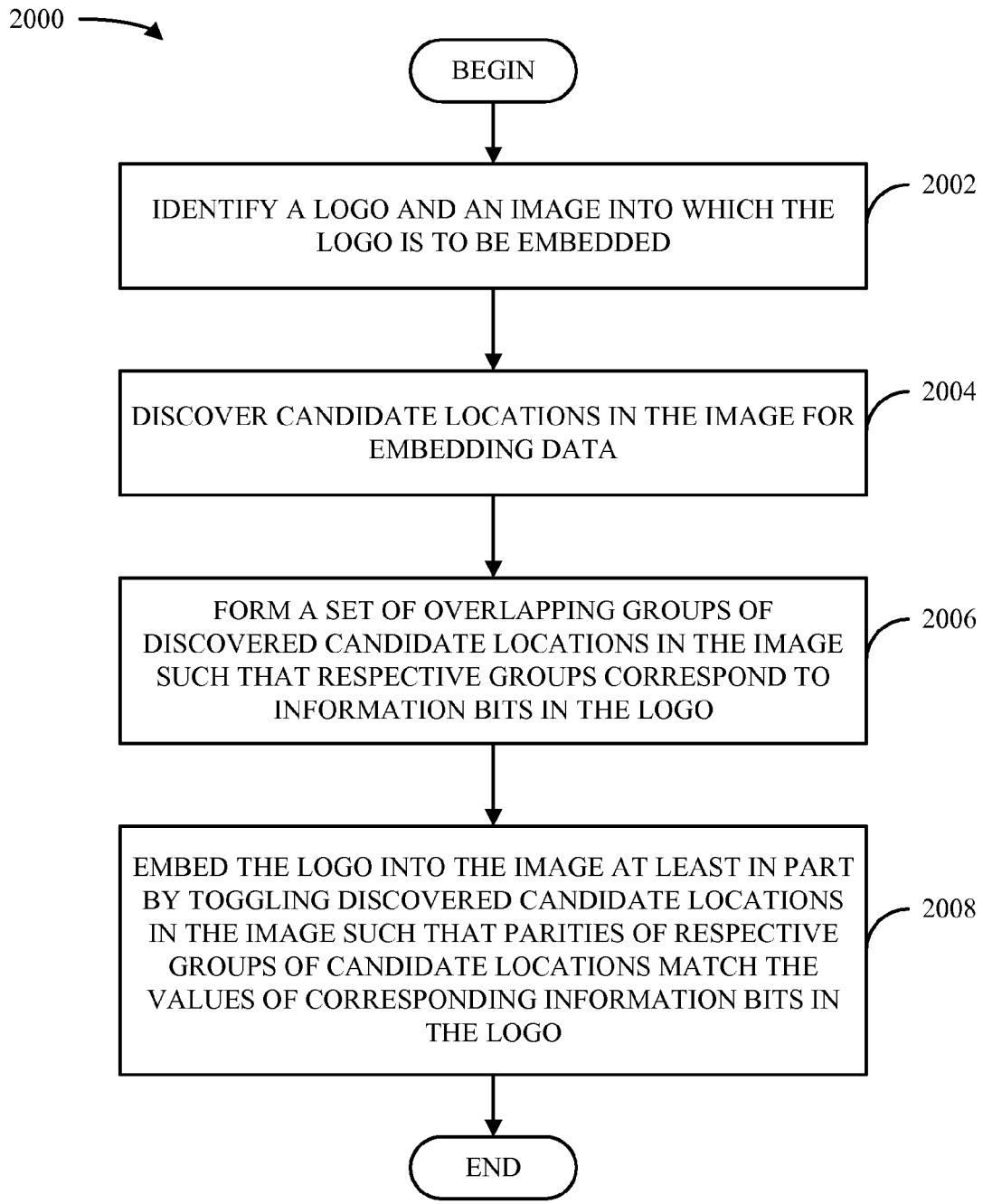
FIGS. 20-23 are flowcharts of respective methods for embedding watermark information in an image.

Referring to FIG. 20, a method 2000 of embedding watermark information in an image is illustrated. At 2002, a logo and an image into which the logo is to be embedded are identified. At 2004, candidate locations in the image identified at 2002 are discovered (e.g., by an embedding candidate selection component 220 at a watermarking component 210). At 2006, a set of overlapping groups of candidate locations discovered at 2004 are formed (e.g., by a parity check component 230) such that respective groups correspond to respective information bits in the logo identified at 2002. At 2008, the logo is embedded into the image (e.g., by a data hiding component 240) at least in part by toggling candidate locations in the image discovered at 2004 such that parities of the respective groups of candidate locations formed at 2006 match the values of corresponding information bits in the logo.

Figure 21:
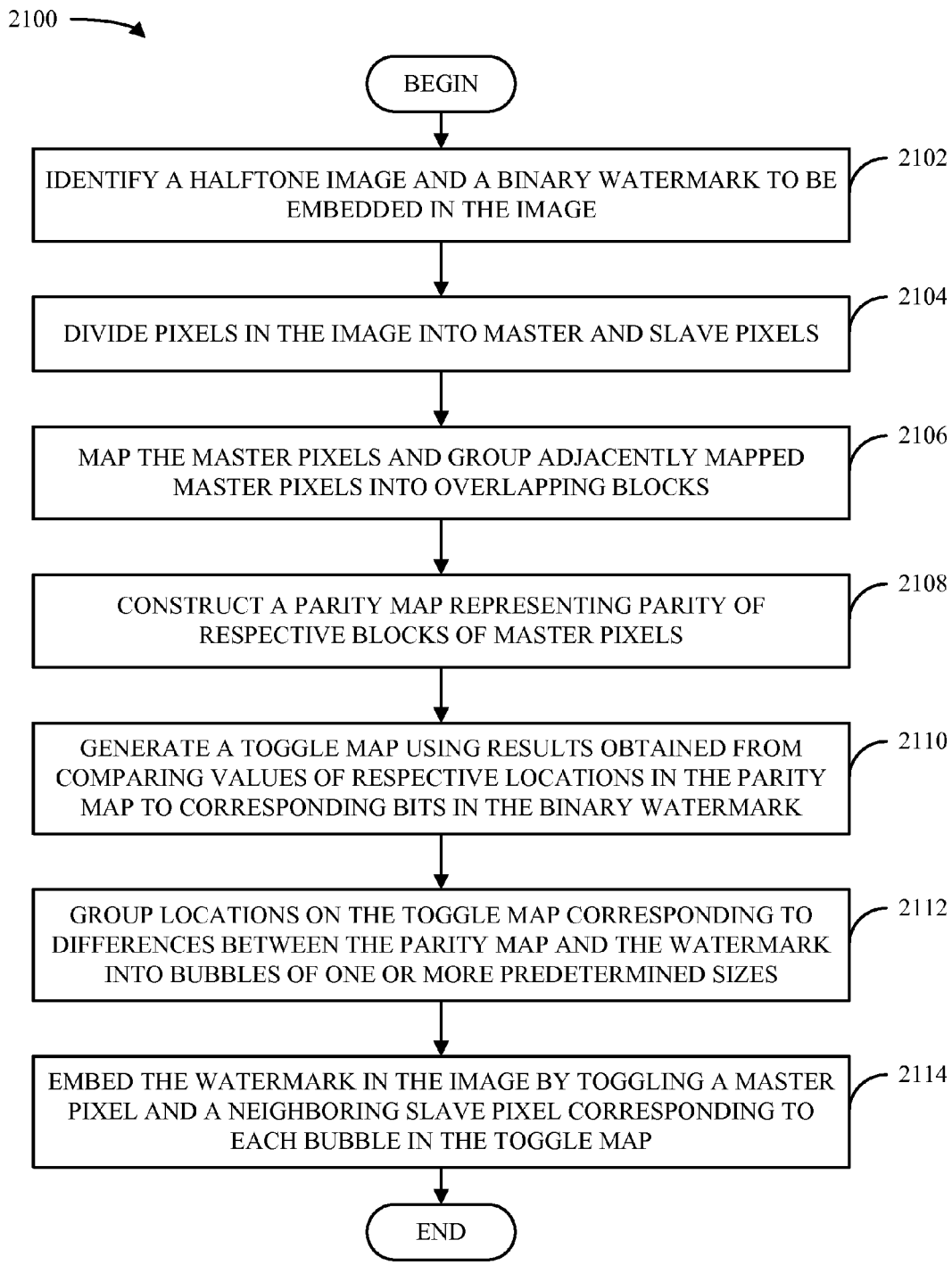

Turning now to FIG. 21, a method 2100 of embedding a binary watermark (e.g., a logo 310) into a halftone image (e.g., an original image 320) is illustrated. In accordance with one aspect, method 2100 can be utilized to implement a Block-Overlapping Parity Check (BOPC) algorithm for generating a watermarked image (e.g., a watermarked image 330). At 2102, a halftone image and a binary watermark to be embedded in the image are identified. At 2104, pixels in the image identified at 2102 are divided into master and slave pixels (e.g., by a master/slave pixel selection component 342 at a watermarking component 340). At 2106, master pixels determined at 2106 are mapped (e.g., by a block-overlapping parity check component 344), and adjacently mapped master pixels are grouped into overlapping blocks. At 2108, a parity map is constructed that represents the parity of respective blocks of master pixels created at 2106.

At 2110, a toggle map is generated (e.g., by a toggle map formation component 346) using results obtained from comparing values of respective locations in the parity map constructed at 2108 to corresponding bits in the binary watermark identified at 2102. At 2112, locations in the toggle map corresponding to differences determined at 2110 between the parity map and the watermark are grouped into bubbles of one or more predetermined sizes (e.g., by a bubble formation component 348). At 2114, the watermark is embedded in the image by toggling (e.g., via a pair toggling component 350) a master pixel and a neighboring pixel corresponding to each bubble created at 2112 in the toggle map generated at 2110.

Figure 22:
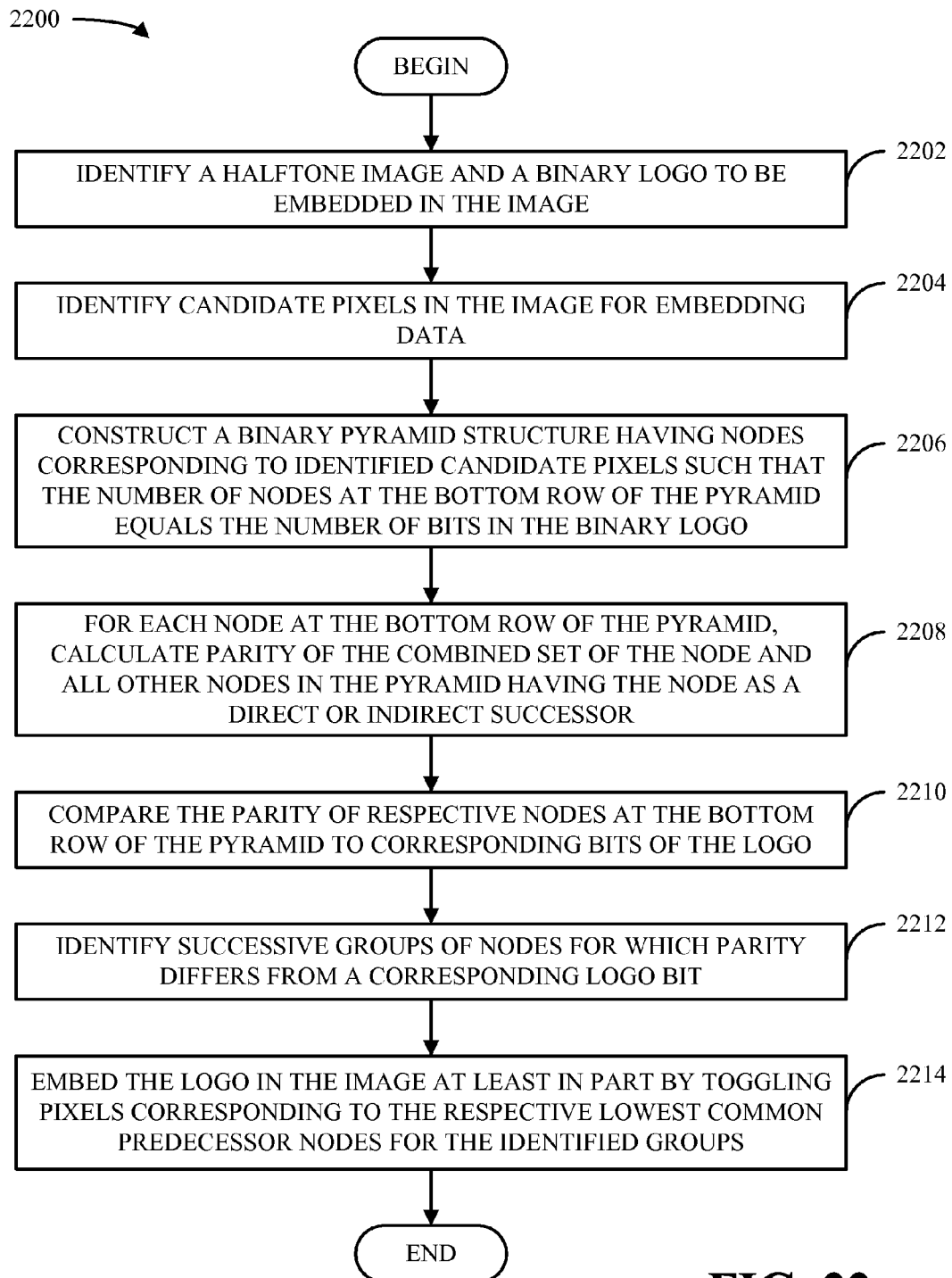

FIG. 22 illustrates a method 2200 of embedding a binary logo (e.g., a logo 910) into a halftone image (e.g., an original image 920). In accordance with one aspect, method 2200 can be utilized to implement a Champagne Pyramid Parity Check (CPPC) algorithm for generating a watermarked image (e.g., a watermarked image 930). At 2202, a halftone image and a binary logo to be embedded in the image are identified. At 2204, candidate pixels in the image identified at 2202 for embedding data are identified (e.g., by an embeddable site discovery component 942 at a watermarking component 940).

At 2206, a binary pyramid structure is constructed (e.g., by a champagne pyramid formation component 944) having nodes corresponding to candidate pixels identified at 2204 such that the number of nodes at the bottom row of the pyramid structure equals the number of bits in the binary logo identified at 2202. At 2208, for each node at the bottom row of the pyramid constructed at 2206, parity is calculated (e.g., by a parity calculation component 946) for the combined set of the respective nodes and all other nodes in the pyramid for whom a respective node is a direct or indirect successor.

At 2210, the parity of respective nodes at the bottom row of the pyramid as calculated at 2208 is compared to corresponding bits of the logo (e.g., by a comparison component 948). At 2212, successive groups of nodes that the comparison at 2210 indicates have parity values that differ from corresponding logo bits are identified (e.g., by a flavor adding optimization component 950). At 2214, the logo is embedded in the image at least in part by toggling pixels (e.g., using a watermark insertion component 952) corresponding to the respective lowest common predecessor nodes for the groups identified at 2212.

Figure 23:
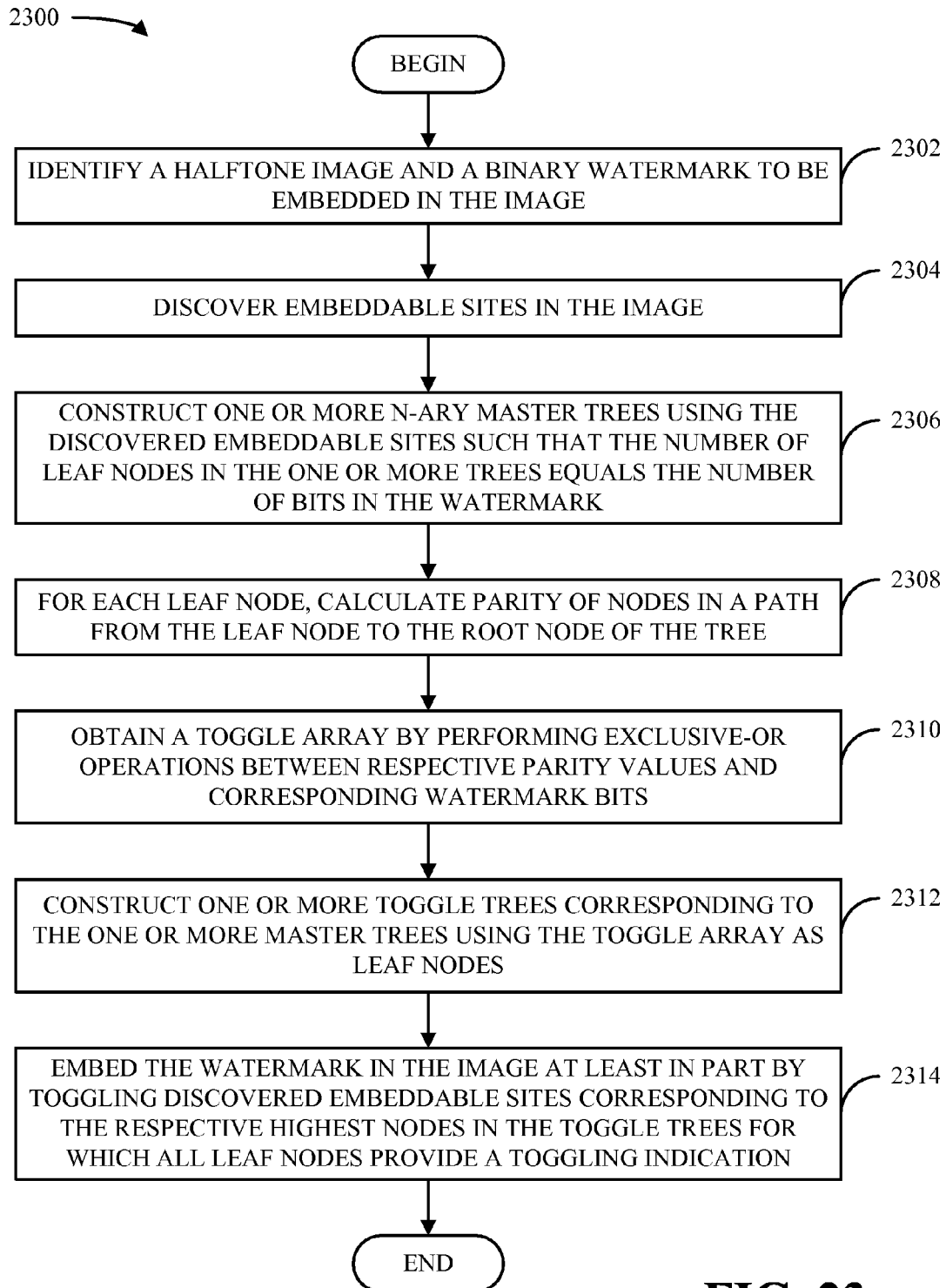

Turning to FIG. 23, another method 2300 of embedding a binary watermark (e.g., a logo 1510) into a halftone image (e.g., an original image 1520) is illustrated. In accordance with one aspect, method 2300 can be utilized to implement a Tree-Based Parity Check (TBPC) algorithm for generating a watermarked image (e.g., a watermarked image 1530). At 2302, a halftone image and a binary watermark to be embedded in the image are identified. At 2304, embeddable sites in the image identified at 2302 are discovered (e.g., by an embeddable site discovery component 1542 at a watermarking component 1500).

At 2306, one or more N-ary master trees are constructed (e.g., by a tree formation component 1544) using the embeddable sites discovered at 2304 such that the number of leaf nodes in the one or more trees equals the number of bits in the watermark identified at 2302. At 2308, for each leaf node in the master trees constructed at 2306, parity is calculated (e.g., by a parity calculation component 1546) of nodes in a path from the leaf node to the root node of the master tree to which the leaf node belongs. At 2310, a toggle array is obtained (e.g., by a comparison component 1548) by performing exclusive-OR operations between respective parity values calculated at 2308 and corresponding bits of the watermark identified at 2302. At 2312, one or more toggle trees are constructed that correspond to the one or more master trees constructed at 2306 using the toggle array obtained at 2310 as leaf nodes. Finally, at 2314, the watermark is embedded into the image at least in part by toggling discovered embeddable sites discovered at 2304 (e.g., by a modification component 1554) corresponding to the respective highest nodes in the toggle trees constructed at 2312 for which all leaf nodes provide a toggling indication (e.g., as determined by a fountain investigation component 1550 and/or a modification location determination component 1552).

Figure 24:
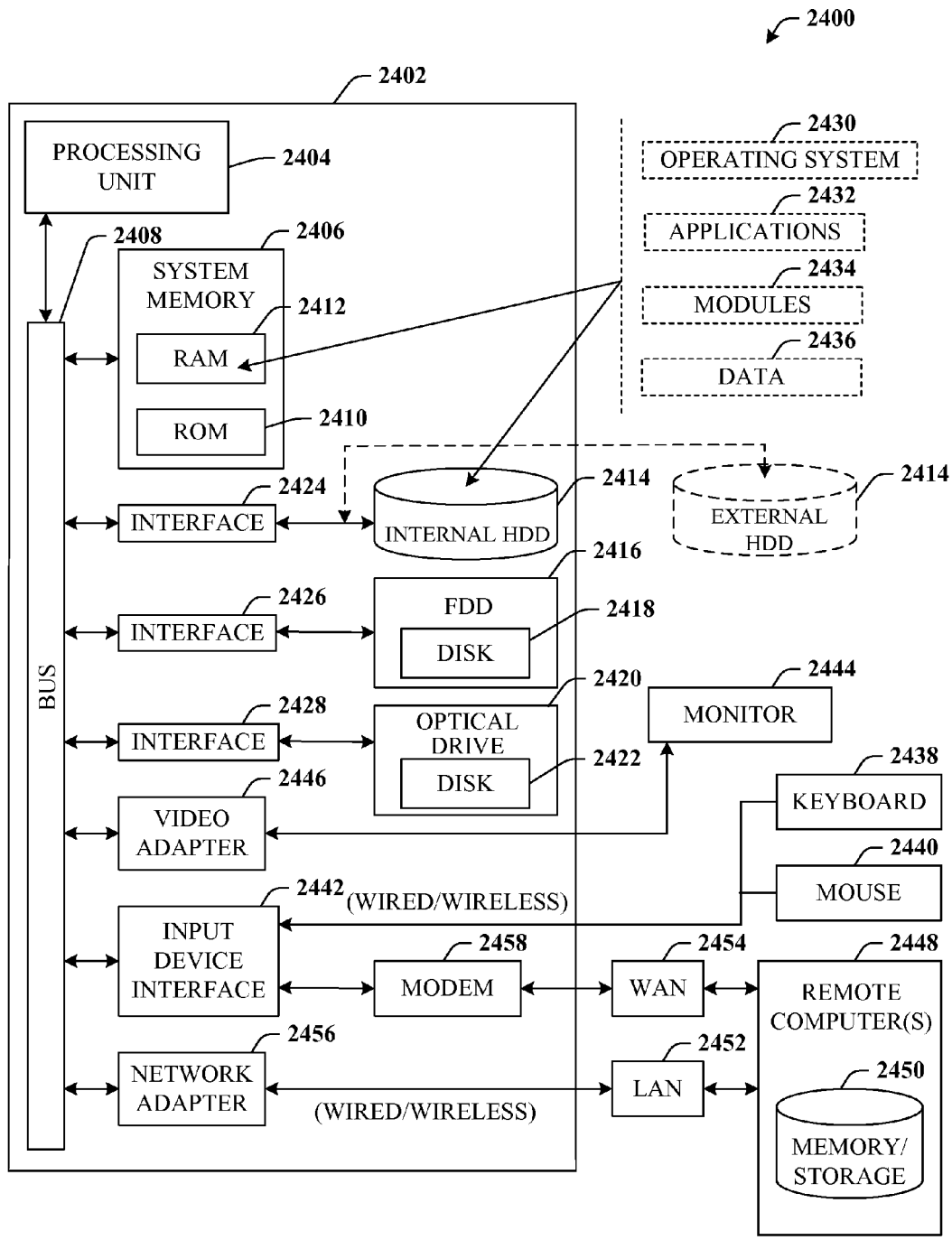
FIG. 24 is a block diagram of an example operating environment in which various aspects described herein can function.

In order to provide additional context for various aspects described herein, FIG. 24 and the following discussion are intended to provide a brief, general description of a suitable computing environment 2400 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 24, an exemplary environment 2400 for implementing various aspects described herein includes a computer 2402, the computer 2402 including a processing unit 2404, a system memory 2406 and a system bus 2408. The system bus 2408 couples to system components including, but not limited to, the system memory 2406 to the processing unit 2404. The processing unit 2404 can be any of various commercially available processors. Dual microprocessors and other multi-processor architectures may also be employed as the processing unit 2404.

The system bus 2408 can be any of several types of bus structure that may further interconnect to a memory bus (with or without a memory controller), a peripheral bus, and a local bus using any of a variety of commercially available bus architectures. The system memory 2406 includes read-only memory (ROM) 2410 and random access memory (RAM) 2412. A basic input/output system (BIOS) is stored in a non-volatile memory 2410 such as ROM, EPROM, EEPROM, which BIOS contains the basic routines that help to transfer information between elements within the computer 2402, such as during start-up. The RAM 2412 can also include a high-speed RAM such as static RAM for caching data.

The computer 2402 further includes an internal hard disk drive (HDD) 2414 (e.g., EIDE, SATA), which internal hard disk drive 2414 may also be configured for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2420 can be connected to the system bus 2408 by a hard disk drive interface 2424, a magnetic disk drive interface 2426 and an optical drive interface 2428, respectively. The interface 2424 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 2402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. It is appreciated that the claimed subject matter can be implemented with various commercially available operating systems or combinations of operating systems.

A user can enter commands and information into the computer 2402 through one or more wired/wireless input devices, e.g., a keyboard 2438 and a pointing device, such as a mouse 2440. Other input devices (not shown) may include a microphone, an IR remote control, a joystick, a game pad, a stylus pen, touch screen, or the like. These and other input devices are often connected to the processing unit 2404 through an input device interface 2442 that is coupled to the system bus 2408, but can be connected by other interfaces, such as a parallel port, a serial port, an IEEE-1394 port, a game port, a USB port, an IR interface, etc.

A monitor 2444 or other type of display device is also connected to the system bus 2408 via an interface, such as a video adapter 2446. In addition to the monitor 2444, a computer typically includes other peripheral output devices (not shown), such as speakers, printers, etc.

The computer 2402 may operate in a networked environment using logical connections via wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which may connect to a global communications network, e.g., the Internet.

When used in a LAN networking environment, the computer 2402 is connected to the local network 2452 through a wired and/or wireless communication network interface or adapter 2456. The adapter 2456 may facilitate wired or wireless communication to the LAN 2452, which may also include a wireless access point disposed thereon for communicating with the wireless adapter 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wired or wireless device, is connected to the system bus 2408 via the serial port interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11(a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

Figure 25:
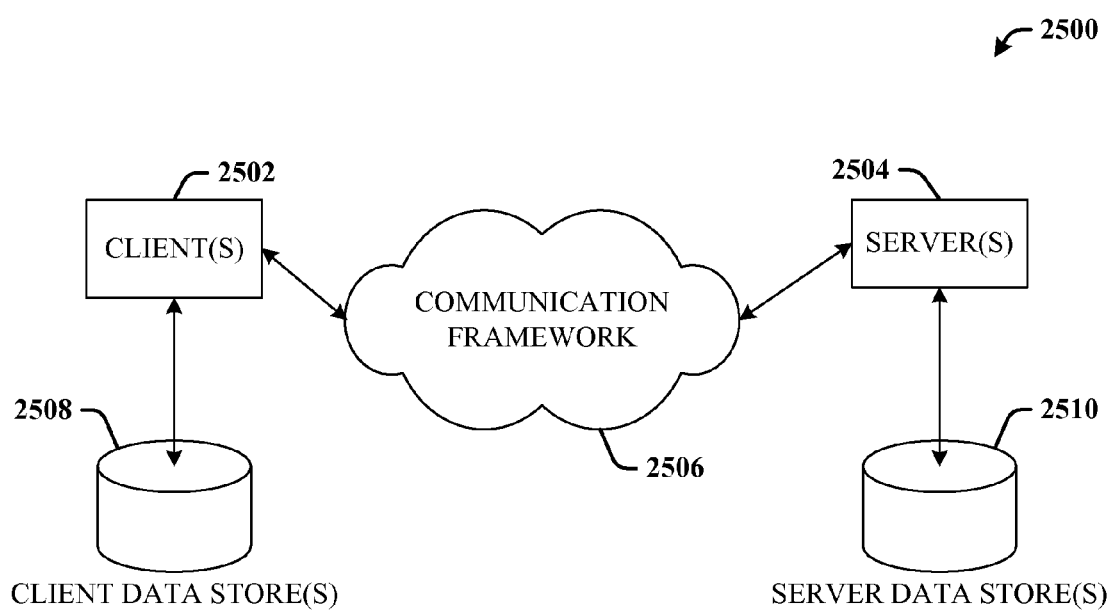
FIG. 25 is a block diagram of an example networked computing environment in which various aspects described herein can function.

Referring now to FIG. 25, there is illustrated a schematic block diagram of an exemplary computer compilation system operable to execute the disclosed architecture. The system 2500 includes one or more client(s) 2502. The client(s) 2502 can be hardware and/or software (e.g., threads, processes, computing devices). In one example, the client(s) 2502 can house cookie(s) and/or associated contextual information by employing one or more features described herein.

The system 2500 also includes one or more server(s) 2504. The server(s) 2504 can also be hardware and/or software (e.g., threads, processes, computing devices). In one example, the servers 2504 can house threads to perform transformations by employing one or more features described herein. One possible communication between a client 2502 and a server 2504 can be in the form of a data packet adapted to be transmitted between two or more computer processes. The data packet may include a cookie and/or associated contextual information, for example. The system 2500 includes a communication framework 2506 (e.g., a global communication network such as the Internet) that can be employed to facilitate communications between the client(s) 2502 and the server(s) 2504.

Communications can be facilitated via a wired (including optical fiber) and/or wireless technology. The client(s) 2502 are operatively connected to one or more client data store(s) 2508 that can be employed to store information local to the client(s) 2502 (e.g., cookie(s) and/or associated contextual information). Similarly, the server(s) 2504 are operatively connected to one or more server data store(s) 2510 that can be employed to store information local to the servers 2504.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A method of embedding binary data in a halftone image, comprising:
   identifying a halftone image and a binary watermark to be embedded in the image;
   discovering candidate sites in the image for embedding data;
   forming the discovered candidate sites into a plurality of overlapping groups;
   determining parity values for respective groups of candidate sites; and
   toggling halftone values of candidate sites in the image such that the parity values for the respective groups of candidate sites match corresponding bits in the binary watermark.

2. The method of claim 1, wherein:
   the discovering comprises discovering master candidate sites and slave candidate sites in the image;
   the forming comprises forming the discovered master candidate sites into overlapping groups;
   the determining comprises determining parity values for respective groups of master candidate sites; and
   the toggling comprises toggling halftone values of respective site pairs comprising a master candidate site and a slave candidate site that is adjacent and complementary to the master candidate site.

3. The method of claim 1, wherein the discovering comprises identifying a predetermined number of pixels in the halftone image at respective pseudo-random locations as candidate sites for embedding data.

4. The method of claim 1, wherein:
   the forming comprises mapping the candidate sites and grouping the mapped candidate sites into a plurality of overlapping blocks;
   the determining comprises determining parity values for respective blocks of mapped candidate sites; and
   the toggling comprises toggling halftone values of candidate sites located in respective blocks of mapped candidate sites for which the parity value of the block does not match a corresponding bit in the binary watermark.

5. The method of claim 4, wherein:
   the determining further comprises constructing a parity map based on the determined parity values for the respective blocks of mapped candidate sites; and
   the toggling further comprises constructing a toggle map using results obtained from comparing respective values in the parity map to corresponding bits in the binary watermark and toggling halftone values of candidate sites located in respective blocks for which the toggle map indicates a disparity between the parity value of the block and a corresponding bit of the binary watermark.

6. The method of claim 5, wherein the toggling further comprises forming a group of locations on the toggle map corresponding to respective intersecting blocks having parity values that do not match corresponding bits in the binary watermark and toggling a halftone value of a candidate site that is common to the blocks of candidate sites represented by the group of locations on the toggle map.

7. The method of claim 1, wherein:
   the forming comprises forming the discovered candidate sites into one or more binary pyramid structures such that a number of nodes at a bottom row of the one or more pyramid structures equals a number of bits in the binary watermark; and
   the determining comprises determining parity values for respective nodes at the bottom of the one or more pyramid structures by determining parity of respective groups comprising a node on the bottom row of a pyramid structure and respective nodes in the pyramid structure having the node on the bottom row as a direct or indirect successor.

8. The method of claim 7, wherein the toggling comprises:
   providing toggling indications for respective nodes at the bottom of a pyramid structure for which a determined parity value for the node differs from a corresponding bit of the binary watermark;
   identifying groups of consecutive nodes for which a toggling indication is provided;
   replacing toggling indications provided by each node in an identified group of consecutive nodes with a single toggling indication at the lowest common predecessor node to each node in the identified group of consecutive nodes; and
   toggling halftone values of respective candidate sites in the halftone image corresponding to nodes in the pyramid structure for which toggling indications are provided.

9. The method of claim 7, wherein the determining comprises determining a parity value for a node by performing an exclusive-OR operation on the halftone value of a candidate site corresponding to the node, a parity value for a left source node to the node for which a parity value is being calculated, a parity value for a right source node to the node for which a parity value is being calculated, and a parity value for an upper source node that is a common source node of the left source node and the right source node.

10. The method of claim 1, wherein:
    the forming comprises forming the discovered candidate sites into one or more complete N-ary tree structures such that a number of leaf nodes of the one or more tree structures equals a number of bits in the binary watermark; and
    the determining comprises determining parity values for respective leaf nodes of the one or more tree structures by determining parity of nodes in paths from the respective leaf nodes to a root node.

11. The method of claim 10, wherein the toggling comprises:
    obtaining a toggle array by comparing respective parity values for the leaf nodes of the one or more tree structures and corresponding bits in the binary watermark;
    constructing one or more toggle trees corresponding to the one or more tree structures at least in part by using respective elements of the toggle array as leaf nodes; and
    toggling halftone values of respective candidate sites in the halftone image corresponding to respective highest nodes in the one or more toggle trees for which all leaf nodes indicate that parity values for the leaf nodes do not match corresponding bits in the binary watermark.

12. The method of claim 10, wherein the determining comprises determining a parity value for a node in a tree structure by performing an exclusive-OR operation between the halftone value of a candidate site corresponding to the node and a parity value for a parent node of the node for which a parity value is being calculated.

13. A computer-readable medium having stored thereon instructions operable to perform the method of claim 1.

14. A system for hiding data corresponding to a logo in a halftone host image, comprising:
    an embedding candidate selection component that receives a halftone host image and identifies one or more candidate locations in the host image for embedding data;

a parity check component that forms the identified candidate locations into overlapping groups and determines parity for respective groups of halftone values of the candidate locations that comprise the respective groups; and a data hiding component that compares parity of respective groups to corresponding information bits of the logo and toggles the halftone value of a candidate locations in respective groups for which the parity of the group does not match the corresponding information bit of the logo.

15. The system of claim 14, wherein:

the embedding candidate selection component identifies a set of candidate master locations and a set of candidate slave locations in the host image in a pseudo-random manner;

the parity check component constructs a master map using the identified set of master candidate locations and constructs a parity map based on parity values obtained for overlapping blocks of mapped master candidate locations; and the data hiding component constructs a toggle map by comparing respective elements of the parity map to corresponding information bits in the logo, groups elements in the toggle map corresponding to overlapping blocks of master candidate locations for which non-matching parity is indicated, and toggles halftone values of a pair of candidate locations comprising a master candidate site and an adjacent slave candidate site with an opposite halftone value for respective groups of elements in the toggle map for which non-matching parity is indicated.

16. The system of claim 14, wherein:

the parity check component constructs one or more champagne pyramid structures comprising respective elements based on the one or more identified candidate locations such that a number of elements at a bottom row of the one or more champagne pyramid structures equals a number of information bits in the logo and obtains respective parity values for the elements at the bottom row of the one or more champagne pyramid structures; and the data hiding component determines respective elements at the bottom row of the one or more champagne pyramid structures for which the parity values of the respective elements do not match the corresponding information bits in the logo, identifies successive groups of identified elements, and toggles halftone values of candidate locations corresponding to lowest common predecessor nodes in the one or more champagne pyramid structures for the identified groups.

17. The system of claim 14, wherein:

the parity check component constructs one or more master tree structures comprising respective elements based on the one or more identified candidate locations such that a number of leaf nodes in the one or more master tree structures equals a number of information bits in the logo and obtains respective parity values for the leaf nodes of the one or more master tree structures; and the data hiding component populates a toggle array with comparisons of parity values of respective leaf nodes in the one or more master tree structures to corresponding information bits in the logo, constructs one or more toggle trees corresponding to the one or more master trees at least in part by utilizing the comparisons in the toggle array as leaf nodes for the one or more toggle trees, iteratively replaces respective toggling indications provided by all child nodes of a common parent node with a single toggling indication at the parent node, and toggles halftone values of candidate locations corresponding to nodes of the one or more toggle trees that provide a toggling indication.

18. The system of claim 14, further comprising an image processing component that identifies an original host image, generates one or more halftone host images at least in part by processing the original host image, and provides the one or more generated halftone host images to the embedding candidate selection component.

19. The system of claim 18, wherein the image processing component generates a halftone host image from an original host image at least in part by converting respective pixels in the original host image having values above a predetermined threshold to a first halftone value and converting respective pixels in the original host image having values below the predetermined threshold to a second halftone value.

20. A system that facilitates watermarking of a halftone image, comprising:

means for determining pixels in a halftone image into which data can be embedded;

means for grouping the determined pixels into a plurality of intersecting groups;

means for obtaining respective parity values for the plurality of intersecting groups;

means for comparing the obtained parity values to corresponding information bits of a watermark; and means for embedding the watermark into the halftone image at least in part by altering halftone values of determined pixels associated with respective groups for which a disparity is present between the parity values for the respective groups and the corresponding information bits of the watermark.

\* \* \* \* \*